(12) United States Patent
Lyu et al.

(10) Patent No.: US 12,408,091 B2
(45) Date of Patent: Sep. 2, 2025

(54) METHOD AND APPARATUS FOR WIRELESS COMMUNICATION

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/886,641

(22) Filed: Sep. 16, 2024

(65) Prior Publication Data

US 2025/0016642 A1   Jan. 9, 2025

Related U.S. Application Data

(63) Continuation of application No. PCT/CN2023/082139, filed on Mar. 17, 2023.

(30) Foreign Application Priority Data

Feb. 1, 2023 (CN) .......................... 202310086806.6

(51) Int. Cl.
*H04W 4/00* (2018.01)
*H04W 36/08* (2009.01)
(Continued)

(52) U.S. Cl.
CPC ......... *H04W 36/08* (2013.01); *H04W 36/322* (2023.05); *H04W 84/06* (2013.01)

(58) Field of Classification Search
CPC .... H04W 36/08; H04W 36/322; H04W 84/06
(Continued)

(56) References Cited

U.S. PATENT DOCUMENTS 5,394,561 A * 2/1995 Freeburg ............ H04B 7/18521
                                                  455/448
6,321,088 B1 * 11/2001 Dempo .............. H04B 7/18541
                                                  455/13.1
(Continued)

FOREIGN PATENT DOCUMENTS

CN         111726844         9/2020
CN         114731561         7/2022
(Continued)

OTHER PUBLICATIONS

3GPP TS 38.133 V17.3.0, "3rd Generation Partnership Project; Technical Specification Group Radio Access Network; NR; Requirements for support of radio resource management (Release 17)," Sep. 2021, 1787 pages.
(Continued)

*Primary Examiner* — Amancio Gonzalez
(74) *Attorney, Agent, or Firm* — Fish & Richardson P.C.

(57) ABSTRACT

The present application provides a method and an apparatus for wireless communication. An example method includes: performing, by a terminal device, cell reselection in a non-terrestrial network (NTN) cell based on first assistant information, wherein the first assistant information is associated with one or more of the following information: distribution of terrestrial network (TN) cells in the NTN cell; a sub-zone in the NTN cell, wherein the sub-zone is related to a coverage angle of a network device corresponding to the NTN cell; or a TN cell comprised in the sub-zone in the NTN cell.

20 Claims, 5 Drawing Sheets

(51) Int. Cl.
*H04W 36/32* (2009.01)
*H04W 84/06* (2009.01)

(58) Field of Classification Search
USPC .......................................................... 370/331
See application file for complete search history.

(56) References Cited

U.S. PATENT DOCUMENTS

| | | | | |
|---|---|---|---|---|
| 7,593,726 | B2 * | 9/2009 | Karabinis | H04B 7/18539 455/448 |
| 7,974,619 | B2 * | 7/2011 | Dutta | H04B 7/18563 455/552.1 |
| 8,131,293 | B2 * | 3/2012 | Dutta | H04B 7/18545 380/247 |
| 8,190,084 | B1 * | 5/2012 | Gunasekara | H04W 28/02 455/12.1 |
| 8,292,741 | B2 * | 10/2012 | Burman | G07F 17/3227 463/40 |
| 8,462,732 | B2 * | 6/2013 | Hong | H04W 36/0011 455/436 |
| 9,306,952 | B2 * | 4/2016 | Burman | G07F 17/32 |
| 9,319,466 | B2 * | 4/2016 | Lu | H04B 7/18506 |
| 9,615,209 | B2 * | 4/2017 | Navani | G08G 1/202 |
| 9,980,171 | B2 * | 5/2018 | Stein | H04W 12/06 |
| 10,845,453 | B2 * | 11/2020 | Markhovsky | G01S 13/765 |
| 11,528,644 | B2 * | 12/2022 | Cheng | H04W 48/18 |
| 11,552,701 | B2 * | 1/2023 | Ananth | H04W 76/11 |
| 11,716,775 | B2 * | 8/2023 | Luo | H04W 76/11 370/329 |
| 11,751,109 | B2 * | 9/2023 | Shrestha | H04B 7/18541 370/331 |
| 11,800,422 | B2 * | 10/2023 | Rezaee | H04W 36/00837 |
| 11,974,214 | B2 * | 4/2024 | Wang | H04W 48/16 |
| 11,997,593 | B2 * | 5/2024 | Liberg | G01S 19/254 |
| 12,009,901 | B2 * | 6/2024 | Wei | H04B 7/1851 |
| 12,063,617 | B2 * | 8/2024 | Cheng | H04W 36/0066 |
| 12,069,490 | B2 * | 8/2024 | Liberg | H04B 7/1853 |
| 12,081,314 | B2 * | 9/2024 | Shrestha | H04B 7/18519 |
| 12,143,872 | B2 * | 11/2024 | Parichehrehteroujeni | H04W 36/305 |
| 2005/0164713 | A1 * | 7/2005 | Tang-Taye | G01S 19/06 455/456.2 |
| 2016/0006499 | A1 * | 1/2016 | Jeong | H04B 7/18523 455/12.1 |
| 2022/0070749 | A1 * | 3/2022 | Wang | H04W 36/0085 |
| 2022/0078746 | A1 * | 3/2022 | Lee | H04W 64/003 |
| 2022/0210703 | A1 * | 6/2022 | Yu | H04W 36/0094 |
| 2022/0232491 | A1 * | 7/2022 | Ma | H04W 48/20 |
| 2022/0240151 | A1 * | 7/2022 | Yu | H04B 7/01 |
| 2022/0279394 | A1 * | 9/2022 | Gao | H04W 48/20 |
| 2022/0377698 | A1 * | 11/2022 | Wang | G01S 13/765 |
| 2023/0007523 | A1 * | 1/2023 | Fu | H04B 7/18541 |
| 2023/0024479 | A1 * | 1/2023 | Ciochina | H04B 7/18541 |
| 2023/0037983 | A1 * | 2/2023 | Catovic | H04W 56/0035 |
| 2023/0041601 | A1 * | 2/2023 | Vangala | H04W 36/322 |
| 2023/0047987 | A1 * | 2/2023 | Tseng | H04W 36/08 |
| 2023/0055988 | A1 * | 2/2023 | Liberg | H04W 76/19 |
| 2023/0060250 | A1 * | 3/2023 | Kumar | H04W 76/27 |
| 2023/0102334 | A1 * | 3/2023 | Roy | H04W 36/06 370/316 |
| 2023/0119744 | A1 * | 4/2023 | Lin | H04L 5/001 370/329 |
| 2023/0189108 | A1 * | 6/2023 | Lee | H04W 56/0015 455/436 |
| 2023/0199857 | A1 * | 6/2023 | Cao | H04B 7/18513 370/329 |
| 2023/0300692 | A1 * | 9/2023 | Ashari | H04L 5/14 370/331 |
| 2023/0319661 | A1 * | 10/2023 | Määttänen | H04W 36/0085 370/331 |
| 2023/0344508 | A1 * | 10/2023 | Tseng | H04W 56/005 |
| 2023/0362692 | A1 * | 11/2023 | Shrestha | H04B 7/18513 |
| 2023/0362704 | A1 * | 11/2023 | Edge | H04W 24/10 |
| 2023/0403585 | A1 * | 12/2023 | Ryu | H04W 56/0015 |
| 2023/0413082 | A1 * | 12/2023 | Yang | H04W 24/08 |
| 2023/0413131 | A1 * | 12/2023 | Shrestha | H04W 36/0058 |
| 2024/0049273 | A1 * | 2/2024 | Lee | H04B 7/18539 |
| 2024/0064698 | A1 * | 2/2024 | Ji | H04W 68/02 |
| 2024/0147337 | A1 * | 5/2024 | Huang | H04W 36/322 |
| 2024/0196298 | A1 * | 6/2024 | Jiang | H04W 36/00835 |
| 2024/0235634 | A1 * | 7/2024 | Buer | H04B 7/0617 |
| 2024/0244701 | A1 * | 7/2024 | Li | H04W 76/28 |
| 2024/0260078 | A1 * | 8/2024 | Choi | H04W 74/0833 |
| 2024/0267853 | A1 * | 8/2024 | Yin | H04W 52/283 |
| 2024/0284194 | A1 * | 8/2024 | Lee | H04W 48/18 |
| 2024/0292368 | A1 * | 8/2024 | Chen | H04W 48/16 |
| 2024/0340747 | A1 * | 10/2024 | Li | H04W 36/00 |
| 2024/0349149 | A1 * | 10/2024 | Wigard | H04W 36/322 |
| 2024/0357454 | A1 * | 10/2024 | Hoppe | H04B 7/2041 |
| 2024/0357460 | A1 * | 10/2024 | Cho | H04W 36/322 |
| 2024/0365192 | A1 * | 10/2024 | Hoppe | H04W 36/083 |
| 2024/0365199 | A1 * | 10/2024 | Saglam | H04B 7/18563 |
| 2024/0381063 | A1 * | 11/2024 | Grau | H04W 8/005 |
| 2024/0381196 | A1 * | 11/2024 | Cheng | H04W 36/00725 |

FOREIGN PATENT DOCUMENTS

| | | |
|---|---|---|
| CN | 115088302 | 9/2022 |
| CN | 115428522 | 12/2022 |
| WO | WO 2021180154 | 9/2021 |
| WO | WO 2022038573 | 2/2022 |

OTHER PUBLICATIONS

International Search Report and Written Opinion in International Appln. No. PCT/CN2023/082139, mailed on Oct. 19, 2023, 8 pages (with partial English translation).

Notice of Allowances in Chinese Appln. No. 202310086806.6, mailed on Oct. 27, 2023, 7 pages (with English translation).

Office Action in Chinese Appln. No. 202310086806.6, mailed on Aug. 19, 2023, 12 pages (with English translation).

* cited by examiner

METHOD AND APPARATUS FOR WIRELESS COMMUNICATION

CROSS-REFERENCE TO RELATED APPLICATIONS

This application is a continuation of International Application No. PCT/CN2023/082139, filed on Mar. 17, 2023, which claims priority to Chinese Patent Application No. 202310086806.6, filed with the China National Intellectual Property Administration on Feb. 1, 2023 and entitled "METHOD AND APPARATUS FOR WIRELESS COMMUNICATION". All of the aforementioned applications are incorporated herein by reference in their entireties.

TECHNICAL FIELD

The present application relates to the technical field of communications, and more specifically, to a method and an apparatus for wireless communication.

BACKGROUND

A non-terrestrial network (NTN) system has relatively strong mobility. In a system (for example, a quasi-earth fixed system) in which coverage of an NTN cell is stationary relative to ground, a terminal device in an idle state or an inactive state can perform cell reselection based on a service cell stop time provided by a network device.

However, in a system (for example, a quasi-earth moving cell) in which the NTN cell moves with the network device, changing coverage of the serving cell is hardly conducive to cell reselection by the terminal device.

SUMMARY

The present application provides a method and an apparatus for wireless communication. Various aspects of the embodiments of the present application are described below.

According to a first aspect, a method for wireless communication is provided. The method includes: performing, by a terminal device, cell reselection in an NTN cell based on first assistant information. The first assistant information is associated with one or more of the following information: distribution of TN cells in the NTN cell; a sub-zone in the NTN cell, where the sub-zone is related to a coverage angle of a network device corresponding to the NTN cell; or a TN cell included in the sub-zone in the NTN cell.

According to a second aspect, a method for wireless communication is provided. The method includes: sending, by a network device, first assistant information to a terminal device. The first assistant information is used by the terminal device to perform cell reselection in an NTN cell. the first assistant information is associated with one or more of the following information: distribution of TN cells in the NTN cell; a sub-zone in the NTN cell, where the sub-zone is related to a coverage angle of a network device corresponding to the NTN cell; or a TN cell included in the sub-zone in the NTN cell.

According to a third aspect, an apparatus for wireless communication is provided. The apparatus is a terminal device, and the terminal device includes: a reselection unit, performing cell reselection in an NTN cell based on first assistant information, where the first assistant information is associated with one or more of the following information: distribution of TN cells in the NTN cell; a sub-zone in the NTN cell, where the sub-zone is related to a coverage angle of a network device corresponding to the NTN cell; or a TN cell included in the sub-zone in the NTN cell.

According to a fourth aspect, an apparatus for wireless communication is provided. The apparatus is a network device, and the network device includes: a sending unit, sending first assistant information to a terminal device, where the first assistant information is used by the terminal device to perform cell reselection in an NTN cell, and the first assistant information is associated with one or more of the following information: distribution of TN cells in the NTN cell; a sub-zone in the NTN cell, where the sub-zone is related to a coverage angle of a network device corresponding to the NTN cell; or a TN cell included in the sub-zone in the NTN cell.

According to a fifth aspect, a communications apparatus is provided. The communications apparatus includes a memory and a processor, where the memory is configured to store a program, and the processor is configured to invoke the program in the memory to perform the method according to the first aspect or the second aspect.

According to a sixth aspect, an apparatus is provided. The apparatus includes a processor, invoking a program from a memory to perform the method according to the first aspect or the second aspect.

According to a seventh aspect, a chip is provided. The chip includes a processor, invoking a program from a memory to cause a device installed with the chip to perform the method according to the first aspect or the second aspect.

According to an eighth aspect, a computer-readable storage medium is provided, where the computer-readable storage medium stores a program that causes a computer to perform the method according to the first aspect or the second aspect.

According to a ninth aspect, a computer program product is provided. The computer program product includes a program that causes a computer to perform the method according to the first aspect or the second aspect.

According to a tenth aspect, a computer program is provided, where the computer program causes a computer to perform the method according to the first aspect or the second aspect.

In the embodiments of the present application, a terminal device can perform cell reselection in an NTN cell based on first assistant information. The first assistant information is associated with one or more pieces of information such as distribution of TN cells in the NTN cell, a sub-zone from a division of a network device based on coverage angles, and a TN cell in the sub-zone. A situation of a neighboring cell near the terminal device can be more accurately determined by using the first assistant information. Therefore, the cell reselection by the terminal device based on the first assistant information is conducive to reduction in unnecessary measurement and power consumption.

DETAILED DESCRIPTION OF THE EMBODIMENTS

Figure 1:
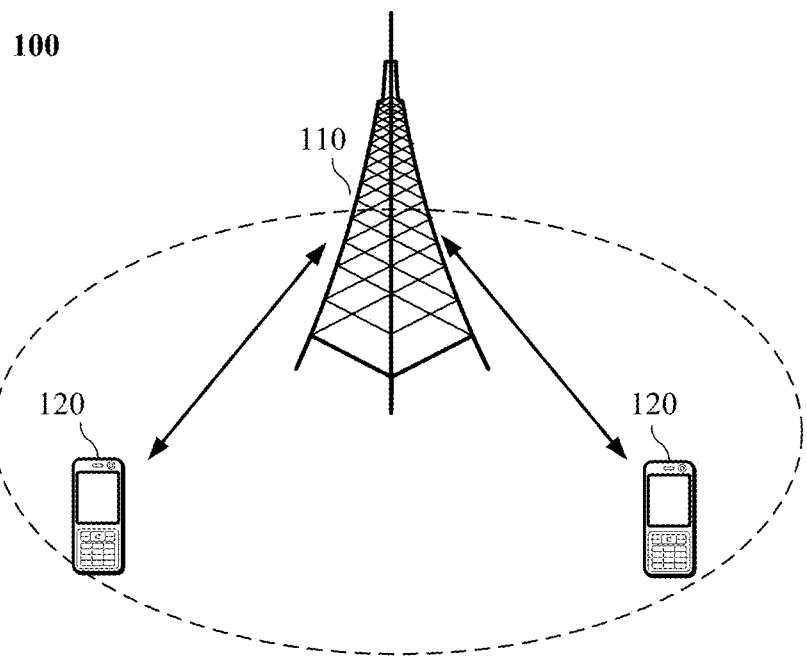
FIG. 1 shows a wireless communications system to which an embodiment of the present application is applied.

The following describes the technical solutions in the embodiments of the present application with reference to the accompanying drawings in the embodiments of the present application. Apparently, the described embodiments are some rather than all of the embodiments of the present application. For the embodiments of the present application, all other embodiments obtained by a person of ordinary skill in the art without creative efforts fall within the protection scope of the present application.

The embodiments of the present application may be applied to various communications systems. For example, the embodiments of the present application may be applied to a global system of mobile communication (GSM), a code division multiple access (CDMA) system, a wideband code division multiple access (WCDMA) system, a general packet radio service (GPRS), a long term evolution (LTE) system, an advanced long term evolution (LTE-A) system, a new radio (NR) system, an evolution system of an NR system, an LTE-based access to unlicensed spectrum (LTE-U) system, an NR-based access to unlicensed spectrum (NR-U) system, an NTN system, a universal mobile telecommunication system (UMTS), a wireless local area network (WLAN), wireless fidelity (WiFi), and a 5th generation (5G) communications system. The embodiments of the present application may be further applied to another communications system, for example, a future communications system. The future communications system may be, for example, a 6th generation (6G) mobile communications system, or a satellite communications system.

Conventional communications systems support a finite quantity of connections and are also easy to implement. However, with the development of communications technologies, a communications system may support not only conventional cellular communication but also one or more pieces of communication in another type. For example, the communications system may support one or more pieces of the following communication: device-to-device (D2D) communication, machine-to-machine (M2M) communication, machine type communication (MTC), vehicle-to-vehicle (V2V) communication, vehicle-to-everything (V2X) communication, and the like. The embodiments of the present application may also be applied to a communications system that supports the foregoing communications.

The communications system in the embodiments of the present application may be applied to a carrier aggregation (CA) scenario, a dual connectivity (DC) scenario, or a standalone (SA) networking scenario.

The communications system in the embodiments of the present application may be applied to an unlicensed spectrum. The unlicensed spectrum may also be called a shared spectrum. Alternatively, the communications system in the embodiments of the present application may be applied to a licensed spectrum. The licensed spectrum may also be called a dedicated spectrum.

The embodiments of the present application may be applied to a terrestrial network (TN) system, or may be applied to an NTN system. For example, the NTN system may include a 4G-based NTN system, an NR-based NTN system, an internet of things (IoT)-based NTN system, and a narrow band-internet of things (NB-IoT)-based NTN system.

The communications system may include one or more terminal devices. The terminal device mentioned in the embodiments of the present application may also be referred to as user equipment (UE), an access terminal, a subscriber unit, a subscriber station, a mobile site, a mobile station (MS), a mobile terminal (MT), a remote station, a remote terminal, a mobile device, a user terminal, a terminal, a wireless communications device, a user agent, a user apparatus, or the like.

In some embodiments, the terminal device may be a station (ST) in a WLAN. In some embodiments, the terminal device may be a cellular phone, a cordless phone, a session initiation protocol (SIP) phone, a wireless local loop (WLL) station, a personal digital assistant (PDA) device, a handheld device having a wireless communication function, a computing device or any other processing device connected to a wireless modem, a vehicle-mounted device, a wearable device, a terminal device in a next generation communications system (for example, an NR system) or a terminal device in a future evolved public land mobile network (PLMN), or the like.

In some embodiments, the terminal device may be a device providing a user with voice and/or data connectivity. For example, the terminal device may be a handheld device, a vehicle-mounted device, or the like having a wireless connection function. In some specific examples, the terminal device may be a mobile phone, a tablet computer (pad), a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

In some embodiments, the terminal device may be deployed on land. For example, the terminal device may be deployed indoors or outdoors. In some embodiments, the terminal device may be deployed on water, for example, on a ship. In some embodiments, the terminal device may be deployed in the air, for example, on an airplane, a balloon, or a satellite.

In addition to the terminal device, the communications system may further include one or more network devices. The network device in the embodiments of the present application may be a device for communicating with the terminal device. The network device may also be referred to as an access network device or a wireless access network device. The network device may be, for example, a base station. The network device in the embodiments of the present application may be a radio access network (RAN) node (or device) that connects the terminal device to a wireless network. The base station may broadly cover the following various names, or may be interchanged with the following names, such as a NodeB, an evolved NodeB (eNB), a next generation NodeB (gNB), a relay station, an access point, a transmitting and receiving point (TRP), a transmitting point (TP), a master eNode MeNB, a secondary eNode SeNB, a multi-standard radio (MSR) node, a home base station, a network controller, an access node, a radio node, an access point (AP), a transmission node, a transceiver node, a baseband unit (BBU), a remote radio unit (RRU), an active antenna unit (AAU), a remote radio head (RRH), a central unit (CU), a distributed unit (DU), and a positioning node. The base station may be a macro base station, a micro base station, a relay node, a donor node, or the like, or a combination thereof. Alternatively, the base station may be a communications module, a modem, or a chip disposed in the device or apparatus described above. Alternatively, the base station may be a mobile switching center, a device that functions as a base station in D2D, V2X, and M2M communication, a network-side device in a 6G network, a device that functions as a base station in a future communications system, or the like. The base station may support networks with a same access technology or different access technologies. A specific technology and a specific device form used by the network device are not limited in the embodiments of the present application.

The base station may be a stationary or mobile base station. For example, a helicopter or an unmanned aerial vehicle may be configured to function as a mobile base station, and one or more cells may move following the mobile base station. In another example, a helicopter or an unmanned aerial vehicle may be configured to serve as a device in communication with another base station.

In some deployments, the network device in the embodiments of the present application may be a CU or a DU, or the network device includes a CU and a DU. The gNB may further include an AAU.

As an example rather than limitation, in the embodiments of the present application, the network device is movable, for example, the network device may be a mobile device. In some embodiments of the present application, the network device may be a satellite or a balloon station. In some embodiments of the present application, the network device may alternatively be a base station located on land, in water, or the like.

In the embodiments of the present application, the network device may provide a service for a cell, and the terminal device communicates with the network device by using a transmission resource (for example, a frequency domain resource or a spectrum resource) used by the cell. The cell may be a cell corresponding to the network device (for example, a base station). The cell may belong to a macro base station or belong to a base station corresponding to a small cell. The small cell herein may include a metro cell, a micro cell, a pico cell, a femto cell, or the like. These small cells feature small coverage and low transmit power, and are suitable for providing a high-speed data transmission service.

For example, FIG. 1 is a schematic diagram of an architecture of a communications system according to an embodiment of the present application. As shown in FIG. 1, a communications system 100 includes a network device 110, and the network device 110 may be a device that communicates with a terminal device 120 (or referred to as a communications terminal or a terminal). The network device 110 may provide communication coverage for a specific geographical region, and may communicate with a terminal device within the coverage.

FIG. 1 exemplarily shows one network device and two terminal devices. In some embodiments of the present application, the communications system 100 may include a plurality of network devices and another quantity of terminal devices may be included within coverage of each network device, which is not limited in the embodiments of the present application.

Figure 2:
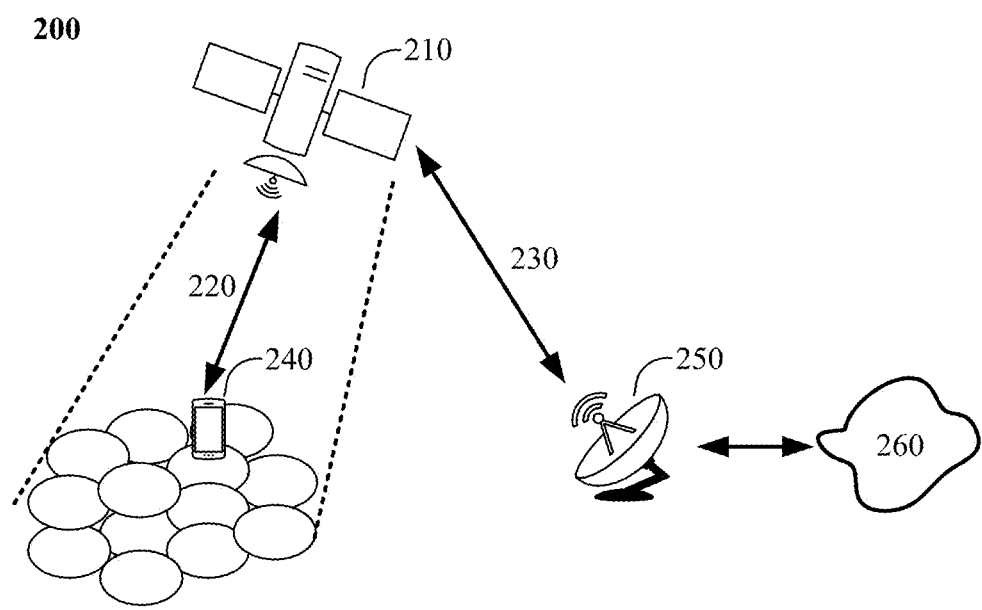
FIG. 2 is an NTN system to which an embodiment of the present application is applied.

For example, FIG. 2 is a schematic diagram of an architecture of the foregoing NTN system. An NTN system 200 shown in FIG. 2 uses a satellite 210 as an air platform. As shown in FIG. 2, a satellite radio access network includes the satellite 210, a service link 220, a feeder link 230, a terminal device 240, a gateway 250, and a network 260 including a base station and a core network.

The satellite 210 is a spacecraft based on a space platform. The service link 220 is a link between the satellite 210 and the terminal device 240. The feeder link 230 is a link between the gateway 250 and the satellite 210. The earth-based gateway 250 connects the satellite 210 to a base station or a core network, depending on selection of an architecture.

The NTN architecture shown in FIG. 2 is a bent pipe transponder architecture. In this architecture, the base station is located on ground behind the gateway 250, and the satellite 210 acts as a relay. The satellite 210 operates as a repeater for forwarding signals of the feeder link 230 to the service link 220, or forwarding signals of the service link 220 to the feeder link 230. In other words, the satellite 210 does not have a function of a base station, and communication between the terminal device 240 and the base station in the network 260 needs to be forwarded by the satellite 210.

Figure 3:
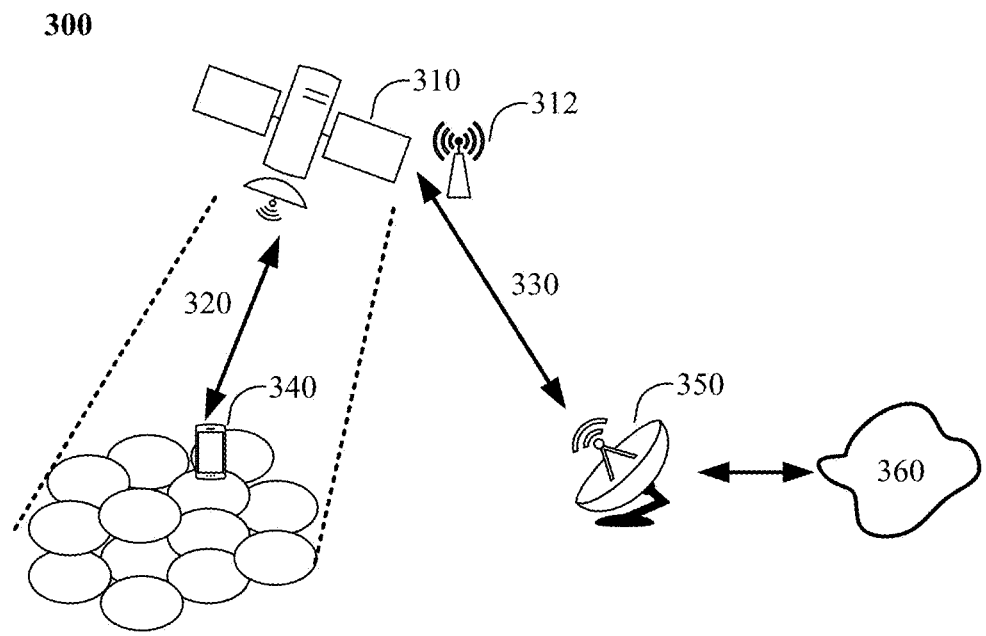
FIG. 3 is another NTN system to which an embodiment of the present application is applied.

For example, FIG. 3 is a schematic diagram of another architecture of the NTN system. An NTN system 300 shown in FIG. 3 also uses a satellite 310 as an air platform. A base station 312 is disposed on the satellite 310, and a network 360 behind a gateway 350 includes only a core network, which are different from the architecture shown in FIG. 2.

The NTN architecture shown in FIG. 3 is a regenerative transponder architecture. In this architecture, the satellite 310 carries the base station 312, and may be directly connected to an earth-based core network through a link. The satellite 310 has a function of a base station, and a terminal device 340 can directly communicate with the satellite 310. Therefore, the satellite 310 may be referred to as a network device.

The communications system in the architecture shown in FIG. 2 or FIG. 3 may include a plurality of network devices, and another quantity of terminal devices may be included in coverage of each network device, which is not limited in the embodiments of the present application.

In the embodiments of the present application, the wireless communications system shown in FIG. 1 to FIG. 3 may further include another network entity, for example, a mobility management entity (MME) or an access and mobility management function (AMF), which is not limited in the embodiments of the present application.

It should be understood that a device having a communication function in a network/system in the embodiments of the present application may be referred to as a communications device. The communications system 100 shown in FIG. 1 is used as an example. The communications device may include the network device 110 and the terminal device 120 that have a communication function. The network device 110 and the terminal device 120 may be specific devices described above, and details are not described herein again. The communications device may further include another device in the communications system 100, for example, another network entity, for example, a network controller or a mobility management entity, which is not limited in the embodiments of the present application.

For ease of understanding, some technical knowledges related to the embodiments of the present application are first introduced. The following related technologies, may be randomly combined with the technical solutions of the embodiments of the present application, as optional solutions, all of which fall within the protection scope of the embodiments of the present application. The embodiments of the present application include at least part of the following content.

With the development of communications technologies, a communications system (for example, 5G) will have a market potential for integrating a satellite and a terrestrial network infrastructure. For example, 5G standards make an NTN, including a satellite segment, become a part of recognized 3rd generation partnership project (3GPP) 5G connection infrastructure.

Communications satellites are classified into low earth orbit (LEO) satellites, medium earth orbit (MEO) satellites, geostationary earth orbit (GEO) satellites, high elliptical orbit (HEO) satellites, and the like depending on different orbital altitudes. LEO is an earth-centered orbit with a height of 2000 km or less, or at least 11.25 periods per day, and an eccentricity being less than 0.25. Most artificial objects in outer space are located in the LEO. The LEO satellites operate around the earth at a high speed (mobility), but on a predictable or definite orbit.

Satellites with different orbital altitudes have different orbital periods.

LEO has a typical height ranging from 250 km to 1500 km and an orbital period ranging from 90 minutes to 120 minutes.

MEO has a typical height ranging from 5000 km to 25000 km and an orbital period ranging from 3 hours to 15 hours.

GEO has a height of about 35786 km and an orbital period of 24 hours.

An NTN is a network or a network segment that uses radio frequency (RF) resources on a satellite or an unmanned aerial system (UAS) platform. A typical scenario of accessing an NTN by a terminal device involves an NTN transparent payload or an NTN regenerative payload. FIG. 2 and FIG. 3 show architectures of two NTN systems by using a satellite as an example. The bent pipe transponder architecture shown in FIG. 2 corresponds to the NTN transparent payload, and the regenerative transponder architecture shown in FIG. 3 corresponds to the NTN regenerative payload.

In a satellite communication-based NTN system, coverage of a serving cell is generally large. A diameter of an NTN cell is at least 50 km. In some embodiments, the NTN cell may cover a plurality of cities deployed with TN cells, or may cover a remote region or an ocean region without a TN cell.

In the NTN system, both the satellite and the UAV system have relatively strong mobility. A cell that a satellite is projected to ground is stationary relative to the ground, or is movable with the satellite. Taking a serving cell corresponding to an LEO satellite as an example, a cell that the LEO satellite is projected to the ground is generally a quasi-earth fixed cell or a quasi-earth moving cell.

A cell that is stationary relative to the ground may be a serving cell whose geographical coverage is fixed. For example, different LEO satellites covers the same region on the ground by adjusting a pointing angle of an antenna. An LEO satellite that fails to cover the region may be replaced with another LEO satellite. For a satellite in a geosynchronous orbit (GSO), a cell projected to the ground may be fixed.

A moving cell may be a serving cell whose geographical coverage changes. For example, a cell that an LEO satellite is projected to the ground may move along with the satellite. Generally, when an antenna of the LEO satellite is perpendicular to the ground, the cell that the LEO satellite is projected to the ground is a moving cell. Regardless of whether the LEO satellite serves as a standalone base station or a relay base station, the moving cell moves with the LEO satellite, and a relative distance between the LEO satellite and a terminal device is constantly changing. After a period of time, a signal of the LEO satellite may not cover the terminal device. If network deployment is relatively complete, a next LEO satellite may cover the terminal device. Since a satellite system is spherical, the next LEO satellite may come from various angles.

A projection location of the satellite perpendicular to the ground may be referred to as a sub-satellite point, or may be referred to as a reference location or a reference point. A trajectory of the reference location of the terrestrial satellite is usually aligned with an orbit of the satellite. In other words, a trajectory of the reference point of the terrestrial satellite may be considered as a projection of the orbit of the satellite.

An operating parameter of the satellite may be represented by ephemeris data. The ephemeris data generally has two formats. One is an orbital parameter, and the other is a position-velocity-time (PVT) parameter. The orbit parameter or the PVT parameter of the satellite may indicate location coordinates of the satellite relative to the ground. The terminal device may determine a future trajectory of the satellite based on the ephemeris data, to determine whether measurement or handover needs to be performed.

When a network device of an NTN accesses a communications system, radio access technologies (RAT) corresponding to different types of satellite devices need to be distinguished. For example, in a case of NR satellite access, a device of a 5G core network (5GC) can distinguish different NR satellite access with different RAT type values. These RAT type values include "NR (LEO)", "NR (MEO)", "NR (GEO)" and "NR (OTHERSAT)". To effectively implement a mobility limitation, corresponding serving cells need to be deployed in tracking areas (tracking area, TA) of different RAT types for a plurality of RAT types. In other words, cells of each NTN RAT type (for example, NR (LEO), NR (MEO), NR (GEO), or NR (OTHERSAT)) need to be deployed in TAs of other RAT types different from the NR satellite and TAs of RAT types different from the terrestrial access. For each NTN RAT type, a non-overlapping tracking area or a core network (CN) registration area are configured, and then a definite mobility registration area (MRA) can be defined.

The NTN system may include a quasi-earth fixed system and a moving unit system. In cell measurement and reselection enhancement, solutions to different systems are different. For example, for time-based cell reselection in the quasi-earth fixed system, a network device may provide a terminal device with a time at which its public cell stops serving. All idle/inactive terminal devices in the cell can perform cell reselection before the cell stop time. For example, for location-based measurement initiation in the quasi-earth fixed system, the network device may provide a reference location and a distance threshold of a serving cell for the terminal device. If a distance between the terminal device and the reference location of the current serving cell is greater than the distance threshold, the terminal device needs to perform neighboring cell measurement.

Taking the Rel-17 specification as an example, this specification specifies a start rule of the location-based measurement and a start rule of the time-based measurement for the NTN quasi-terrestrial fixed cell respectively. For the start rule of the location-based measurement, a distance threshold and a reference location of a serving cell (for example, a cell center on the ground) are introduced. If a distance between the terminal device and the reference location of the serving cell is less than the distance threshold and a conventional signal receiving condition is met, the terminal device may not perform priority-based neighboring cell measurement. The signal receiving condition may be a reference signal received power (RSRP) condition, or may be a reference signal received quality (RSRQ) condition. The priority-based neighboring cell measurement is neighboring cell measurement based on intra-NR or inter-NR frequencies with a same or lower priority or inter-RAT frequencies with a lower priority. For the start rule of the time-based measurement, this rule introduces a service cell stop time, that is, a time at which the cell stops covering a current region. If the cell stop time is configured, the terminal device needs to start neighboring cell measurement before the cell stop time, regardless of whether the foregoing location condition or the conventional RSRP/RSRQ condition is met.

However, the foregoing solution applicable to the quasi-earth fixed system is not applicable to the moving unit system.

For the moving unit system, coverage of an NTN cell moves along with the network device. Even if the terminal device is stationary, a location of the terminal device relative to the network device changes. In other words, for the moving unit system, locations of both the terminal device and the serving cell may change. Taking a moving cell of a low-orbit (LEO) satellite as an example, a typical velocity of the LEO satellite is 7.56 km/s. As the LEO satellite moves, a footprint of the satellite slides on the earth. Considering that a diameter of the NTN cell is at least 50 km, all idle/inactive terminal devices in the cell need to be distributed within 6.61 seconds. In other word, all terminal devices in the cell need to reselect another camping cell, and an additional terminal device may also camp in the cell. If the foregoing solution is adopted, information that is provided by the network device for the terminal device to trigger cell measurement/reselection is likely inaccurate, which is hardly conducive to neighboring cell measurement or cell reselection by the terminal device.

As described above, an NTN cell typically provides much larger coverage than a TN cell. Since the coverage of the NTN cell is large enough, one NTN unit may cover both marine and land regions. Generally, more TN cells are set in the land region. For example, many terrestrial TN cells may be available in an NTN cell served by a satellite.

Considering characteristics of the NTN, in a mobility management area, it is very likely that a network-side device allocates a higher priority to frequency measurement of a TN cell than that of an NTN. When the NTN cell includes a plurality of TN cells, a terminal device in a public region of the TN cell and the NTN cell and a terminal device in only a region of the NTN cell may need to consider how to effectively perform cell reselection between the TN cell and the NTN cell. In other words, the terminal device within the NTN cell may be located in a region without TN coverage. In the region without TN network coverage, the terminal device does not need to perform neighboring cell measurement for a neighboring cell of the TN cell.

Further, considering states of the terminal devices in the common region and the region of the NTN cell, to effectively perform cell reselection, assistant information needs to be provided to help the terminal device perform measurement for the reselection. For example, for a terminal device in a radio resource control (RRC) idle state (RRC_IDLE) or an RRC inactive state (RRC_INACTIVE), mobility of the NTN cell and NTN-TN need to be considered for performing cell reselection by the terminal device. Measurement for the cell reselection increases power consumption of the terminal device. In other words, the terminal device in an idle state does not establish an RRC connection to the network device. In a case of a moving cell, the terminal device cannot determine whether the terminal device is still within coverage of the network device. Therefore, the terminal device in an idle state may need to periodically receive broadcast information or system information to measure a location relative to a serving cell. These measurements increase power consumption of the terminal device.

To resolve some of the foregoing problems, an embodiment of the present application proposes a method for wireless communication. In this method, first assistant information instructs a terminal device to perform cell reselection. For a terminal device in an idle state or an inactive state, measurement for the cell reselection is performed only when the first assistant information is received, thereby reducing unnecessary measurement and power consumption of the terminal device during movement of an NTN cell. For ease of understanding, the following describes in detail main technical solutions of the embodiments of the present application with reference to FIG. 4.

Figure 4:
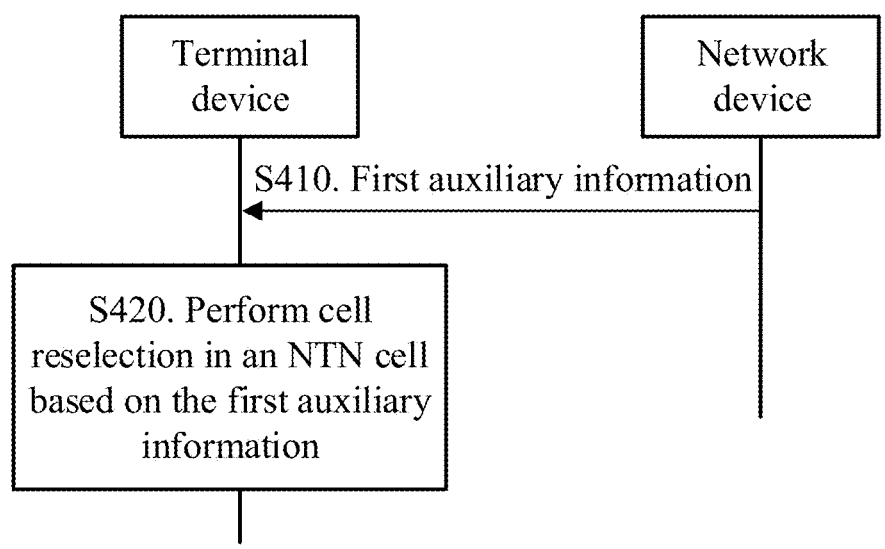
FIG. 4 is a schematic diagram of a method for wireless communication according to an embodiment of the present application.

FIG. 4 is illustrated from the perspective of interaction between a terminal device and a network device. The terminal device determines, through communication with the network device, an occasion for triggering cell reselection.

The terminal device may be any one of the foregoing terminal devices that communicate with the network device in the NTN cell, or may be a terminal device that communicates within another terrestrial moving cell. In some embodiments, the terminal device may be a communications device with relatively low mobility in NB-IoT. In some embodiments, the terminal device may be a communications device in a common region of an NTN cell and a TN cell. In some embodiments, the terminal device may be a communications device only in a region of the NTN cell.

In some embodiments, the terminal device may be a communications device in an idle state or an inactive state in the NTN cell. The terminal device may receive broadcast information or system information sent by the network device. In some embodiments, the terminal device may be a communications device in an active state. The terminal device may receive broadcast information or system information sent by the network device, or may receive dedicated signalling sent by the network device. The dedicated signalling facilitates reduction in consumption of common resources.

The network device may be a communications device that provides a network service in the NTN cell in which the terminal device is located. For example, the network device may be a satellite used as a standalone base station, or may be a UAV system used as a relay base station.

The NTN cell may be a serving cell whose coverage is stationary relative to ground, for example, a quasi-earth fixed cell. The NTN cell may be alternatively a serving cell in which coverage changes with the network device, for example, a quasi-earth moving cell. This is not limited herein.

Referring to FIG. 4, in step S410, a terminal device receives first assistant information sent by a network device.

The first assistant information is used to instruct the terminal device to perform cell reselection. To effectively perform the cell reselection, the terminal device needs to determine distribution of a plurality of networks in an NTN cell and distribution of TN cells. The first assistant information is associated with one or more pieces of information to indicate to the terminal device how to perform the cell reselection. The information associated with the first assistant information may include distribution of TN cells in the NTN cell, a sub-zone in the NTN cell, or a TN cell included in the sub-zone in the NTN cell.

In some embodiments, the first assistant information is associated with the distribution of TN cells in the NTN cell, to instruct the terminal device to perform the cell reselection. The cell reselection is usually NTN-TN cell reselection. In a possible implementation, the first assistant information may indicate, to the terminal device based on the distribution of TN cells, whether there is a neighboring TN cell. The terminal device may determine, based on the information, whether to perform measurement related to the cell reselection.

In a possible implementation, the distribution of TN cells may include a plurality of pieces of information. These pieces of information may be location coordinates of the TN cells in the NTN cell, location coordinates of the TN cell relative to a center of the NTN cell, coverages of the TN cell, or a boundary line between coverage of the TN cell and coverage of the NTN cell. Based on one or more of the foregoing information, the terminal device may determine, based on a situation of a surrounding TN cell, whether to perform the cell reselection.

For example, the terminal device may determine a location of the TN cell based on the location coordinates of the TN cell or the location coordinates relative to the center of the NTN cell. The terminal device may determine, based on location information of the terminal device, whether there is a TN cell that can be used for the cell reselection around the terminal device.

For example, the terminal device may determine coverage of the TN cell based on the location coordinates and the coverage of the TN cell. The terminal device may determine, based on the coverage of the TN cell and mobile information of the terminal device, when to perform the cell reselection.

For example, the terminal device may determine a distance from the TN cell based on the boundary line between the coverage of the TN cell and the coverage of the NTN cell. The terminal device may determine, based on a change in the distance from the TN cell, when to perform the cell reselection.

In some embodiments, the first assistant information is associated with the sub-zone in the NTN cell to instruct the terminal device to perform the cell reselection. After the terminal device receives the assistant information, the terminal device may calculate, based on location information of the terminal device and the received assistant information, a sub-zone to which the terminal device belongs. A proper division into sub-zones can help the terminal device perform the cell reselection. To more effectively perform the cell reselection, the sub-zone in the NTN cell may be related to a coverage angle of the network device. For example, when the division is performed based on the coverage angle of the network device, the terminal device may determine a distance from an edge of the NTN cell based on a sub-zone in which the terminal device is located, so as to determine whether to perform the cell reselection. If the terminal device is to be out of the coverage of the NTN cell, measurement for the cell reselection needs to be triggered in advance. The following describes division of the NTN cell in detail with reference to FIG. 8.

In a possible implementation, a system may notify, through broadcast/system information (for example, an SIB), the terminal device that the NTN cell is divided into a plurality of sub-zones, that is, finely divided into a plurality of virtual regions. The terminal device may determine the sub-zone in which the terminal device is located, and determine, based on a network situation in the sub-zone in which the terminal device is located, whether to perform the cell reselection.

In some embodiments, the first assistant information is associated with the TN cell included in the sub-zone in the NTN cell, to instruct the terminal device to perform the cell reselection. There may be a plurality of manners of divisions into sub-zones including a TN cell, which are not limited herein. For example, the NTN cell is divided based on the coverage angle mentioned above. For another example, the NTN cell is divided in a grid pattern. In the following, a plurality of cell divisions are specifically described with reference to FIG. 8 to FIG. 10.

In a possible implementation, the sub-zone in the NTN cell may correspond to frequency information of the TN cell in the sub-zone. TN frequency information corresponding to the sub-zone in which the terminal device is located is used as assistant information, to help the terminal device perform TN measurement more accurately. Further, if a sub-zone highly matches a terrestrial TN network architecture, the terminal device can know frequency distribution of TN cells in each sub-zone.

In a possible implementation, the TN cell included in the sub-zone may further include a frequency information group, of a TN cell, corresponding to the sub-zone. When the NTN cell includes a plurality of sub-zones, each of the plurality of sub-zones corresponds to one frequency information group of a TN cell. One or more frequencies in the frequency information group each have a corresponding priority, and the priority may be used by the terminal device to perform the cell reselection. In other words, the terminal device obtains frequency list information of the sub-zone in which the terminal device is located, and a TN frequency table in each region has priority arrangement. For example, based on TN frequency information of different regions, a priority of a TN frequency of the NTN sub-zone in which the terminal device is located is higher than a priority of a frequency of another NTN sub-zone. For a TN frequency with a higher reselection priority, the terminal device performs related measurement based on a defined detection threshold.

In a possible implementation, the terminal device may obtain a TN frequency list of the region in which the terminal device is located through the first assistant information, and correspondingly perform measurement. For differentiation, different identifiers may be used for frequency groups of the NTN cell and the TN cell.

Figure 5:
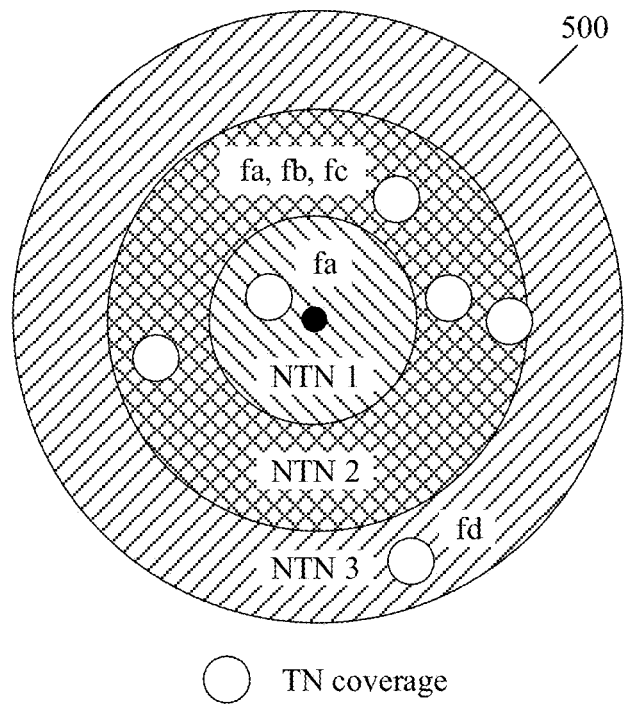
FIG. 5 is a schematic diagram of an NTN cell to which an embodiment of the present application is applied on ground.

For ease of understanding, the following describes the frequency information group, of the TN cell, corresponding to the sub-zone of the NTN cell with reference to the NTN cell division shown in FIG. 5. FIG. 5 is a schematic diagram showing an NTN cell on ground to which an embodiment of the present application is applied.

Referring to FIG. 5, an NTN cell 500 is divided into three sub-zones: a sub-zone NTN 1, a sub-zone NTN 2, and a sub-zone NTN 3. As shown in FIG. 5, there is one TN cell in the sub-zone NTN 1, and a corresponding frequency is fa. There are four TN cells in the sub-zone NTN 2, and corresponding frequencies are respectively fa, fb and fc. There is one TN cell in the sub-zone NTN 3, and a corresponding frequency is fd. Therefore, frequency information groups corresponding to the sub-zones of the NTN cell 500 may be represented as follows:

the region 1: frequency information group {fa};
the region 2: frequency information group {fa, fb, fc}; and
the region 3: frequency information group {fd}.

The terminal device is notified that it is in a sub-zone, for example, the region NTN 2, that there is a TN cell in the region and that a frequency information group of the TNs is {fa, fb, fc}. However, the terminal device may not know distances from these TN regions to itself. As described above, the network device may notify the terminal device of a coordinate location of each TN cell in the sub-zone or a location of a boundary line between coverage of the TN cell and coverage of the NTN cell.

Returning to step S410 shown in FIG. 4, in some embodiments, the information associated with or included in the first assistant information may further include frequency information of the TN cell, and a reference location and a distance threshold of a neighboring cell of the TN cell. The frequency information of the TN cell may include frequency information of all TN cells in the NTN cell. The reference location and the distance threshold of the neighboring cell of the TN cell may be used by the terminal device to perform the cell reselection in the TN cell, or perform measurement on the neighboring cell for the cell reselection in a case that handover of the TN cell fails.

For a quasi-earth moving cell, the coverage of the NTN cell varies with movement of the network device. The network device needs to periodically update one or more pieces of information associated with or included in the first assistant information. For example, the network device may provide TN frequency lists within the coverage at different time points through broadcasting.

In some embodiments, the first assistant information may be carried in one or more of the following information: broadcast information, system information, or dedicated signalling. In other words, the network device may send the first assistant information to the terminal device through one or more of the foregoing information. The dedicated signalling can reduce consumption of common resources.

The first assistant information can facilitate prevention of unnecessary measurement performed by the terminal device on the TN cell. A direct solution to reduce unnecessary measurement is to broadcast location information of the TN cell, so that the terminal device can know whether it is necessary to initiate measurement. Broadcast information of the network device can identify the NTN cell and the TN cell, so that the terminal device knows whether a cell initiated the measurement is the NTN cell or the TN cell.

In step S420, the terminal device performs the cell reselection in the NTN cell based on the first assistant information.

The cell reselection may be alternatively cell handover. The cell reselection by the terminal device in the NTN cell may be NTN-NTN handover or NTN-TN handover. In other words, a cell resulted from cell reselection by the terminal device in the NTN cell may be an NTN cell or a TN cell, which is not limited herein.

The NTN cell and the TN cell deployed in the network may be deployed in different PLMNs/a same PLMN. In some embodiments, the NTN and the TN are in a same PLMN, a terminal device in an inactive state, when performing the cell reselection, may retain a communication parameter between the terminal device and a current cell. The communication parameter may include a protocol data unit (PDU) session and a data radio bearer (DRB) that is configured by the terminal device. For example, a terminal device in an RRC_INACTIVE state is in a scenario in which an NTN cell and a TN cell overlap, the terminal device retains an existing PDU session and a configured DRB when performing TN cell reselection, and switches RRC_CONNECTED or RRC_IDLE. In other words, the terminal device in an RRC_INACTIVE state served by an NTN cell re-selects to be served by a TN cell from the NTN cell before RRC state switching with the communication parameter remains, and then performs the state switching. Similarly, the communication parameter also remains as UE in an RRC_INACTIVE state served by a TN cell reselects to be served by an NTN cell.

In some embodiments, updating a mobility registration area is triggered by cell reselection of the terminal device in an inactive state. For example, when the terminal device in an RRC_INACTIVE state switches to a TN cell from an NTN cell or vice versa, the updating of the mobility registration area is necessary to notify an AMF that the terminal device has entered another TA or MRA. In addition, a terminal device in a connected state is also allowed to switch to a TN cell from an NTN cell.

In some embodiments, measurement corresponding to the cell reselection may be performed to determine a plurality of detection parameters based on a defined detection threshold. For example, the defined detection threshold may include one or a part or all of a detection period, a distance, detection energy (for example, RSRP), and the number of detections.

When performing the cell reselection, the terminal device performs handover between networks of different types based on a tracking area corresponding to a cell. In some embodiments, the network-side device defines a tracking area based on a plurality of RATs corresponding to NTN satellite types. For a scenario in which an NTN cell and a TN cell overlap, mobility management can be performed by clearly defining TAs or MRAs of the NTN cell and the TN cell.

In some embodiments, the terminal device may perform the cell reselection based on a priority of a network frequency. In the NTN cell, priorities of different frequencies or inter-system frequencies of a TN system may come from system information blocks (SIB), and different systems in RRC release and inter-system reselection. If no reselection priority is configured in SIB inter-frequency, measurement for the cell reselection is not performed. If a frequency priority is configured by using dedicated signalling, the terminal device ignores all priorities from SIBs. For example, the dedicated signalling sets a frequency priority of an NTN region.

In a possible implementation, if system information/dedicated signalling sets reselection priorities of the NTN and the TN, it is equivalent to introducing a relaxation measurement time for a TN frequency whose reselection priority is higher than a reselection priority of the current NTN cell. In other words, regardless of whether the terminal device is currently within the NTN cell or the TN cell, a long period can be configured for measurement on the TN/NTN cell. For example, when the terminal device is within the TN cell, a long period is configured for measurement on the NTN cell. This can reduce power consumption by the terminal device performing reselection between the NTN and the TN.

In a possible implementation, if a reselection priority of a frequency corresponding to the TN cell is higher than a reselection priority of a frequency corresponding to the NTN cell, the terminal device may perform measurement for the cell reselection based on priorities of different frequencies in an inter-frequency list and/or an inter-RAT frequency list. For example, as specified in the specification TS 38.133, the terminal device may perform NR inter-frequency or inter-RAT measurement of a higher priority. The inter-frequency list (NR NTN or TN) and the inter-RAT frequency list (IoT NTN or TN) may be expanded to add a TN/NTN indication.

It is evident from FIG. 4 that the cell reselection by the terminal device based on the first assistant information can facilitate prevention of unnecessary measurement on the TN cell and reduction in power consumption. The coverage, of the TN cell, associated with the first assistant information can help the terminal device perform NTN-TN and TN-NTN. For a quasi-earth fixed cell and a quasi-earth moving cell, the coverage of the TN cell can be described in various manners.

In some embodiments, the coverage of the TN cell is determined based on a distance range and/or an angle range of the TN cell that are/is relative to the center of the NTN cell. A reference direction of the angle range may be a moving track of the network device, or may be a reference axis related to a geographical region of the NTN cell.

In a possible implementation, when a connection line between the TN cell and the center of the NTN cell forms an acute angle relative to the reference direction, the TN cell may be represented by the angle and the distance range. In other words, if an angle $\beta_1$ of the TN cell relative to the reference direction is less than 90 degrees and a distance between the TN cell and the center of the NTN cell is between $DL_1$ and $DL_2$, the coverage of the TN cell is represented by $\beta_1$, $DL_1$, and $DL_2$.

In another possible implementation, when a connection line between the TN cell and the center of the NTN cell forms a right angle or an obtuse angle relative to the reference direction, the TN cell may be represented by a plurality of angles and the distance range. In other words, if an angle $\beta_2$ of the TN cell relative to the reference direction is greater than or equal to 90 degrees and a distance between the TN cell and the center of the NTN cell is between $DL_1$ and $DL_2$, the coverage of the TN cell is represented by 90 degrees, $\beta_2$, $DL_1$, and $DL_2$.

Figure 6:
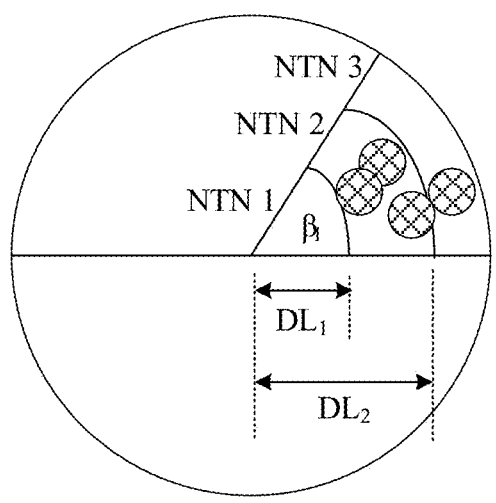
FIG. 6 is a schematic diagram showing distribution of TN cells to which an embodiment of the present application is applied.
Figure 7:
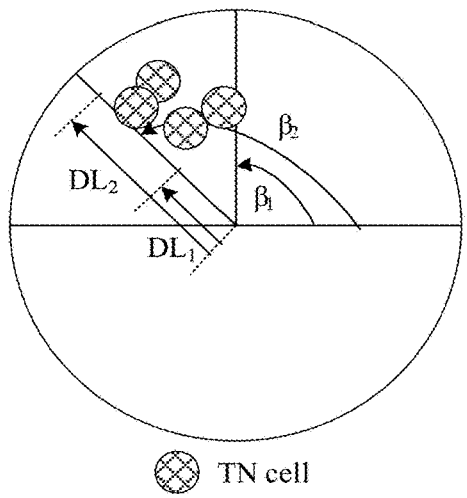
FIG. 7 is schematic diagram showing another distribution of TN cells to which an embodiment of the present application is applied.

For ease of understanding, the following describes representations of different distributions of TN cells with reference to FIG. 6 and FIG. 7. FIG. 6 is a schematic diagram in which TN cells are located in an acute angle region, and FIG. 7 is a schematic diagram in which TN cells are located in an obtuse angle region.

Referring to FIG. 6, when $\beta_1$ is less than 90°, that is, the angle range relative to the reference direction is less than 90 degrees, the coverage of the TN cell is represented by the angle $\beta_1$ and the two distance values $DL_1$ and $DL_2$.

Referring to FIG. 7, when the angle range relative to the reference direction is greater than or equal to 90 degrees, the coverage of the TN cell is represented by two angles $\beta_1$ and $\beta_2$ and the two distance values $DL_1$ and $DL_2$.

In some embodiments, the coverage of the TN cell is represented by a sub-zone in which the TN cell is located. The TN cells in the NTN cell shown in FIG. 5 are used as an example. The outermost TN cell in the NTN cell is represented by the sub-zone NTN 3. Distribution of TN cells shown in FIG. 6 is used as an example. In FIG. 6, an NTN 1, an NTN 2, and an NTN 3 represent three sub-zones in the NTN cell. In FIG. 6, three TN cells whose distances from the center of the NTN cell are between $DL_1$ and $DL_2$ each are represented by the NTN 2, and one TN cell whose distance from the center of the NTN cell is greater than $DL_2$ is represented by the NTN 3. For a plurality of other divisions, reference may be made to FIG. 8 to FIG. 11 below for specific description.

The foregoing describes how the terminal device performs the cell reselection based on the first assistant information with reference to FIG. 4 to FIG. 7. The first assistant information is used by the terminal device to determine when to initiate measurement for the cell reselection. However, when specifically initiating the measurement, the terminal device further performs the cell reselection based on distance information, time information, and boundary information of the TN cell and a priority of the TN cell, so as to more effectively perform measurement related to the cell reselection.

In some embodiments, in addition to the first assistant information, the terminal device performs the cell reselection based on one or more pieces of measurement-related information. The measurement-related information is, for example, a distance reselection threshold set by the terminal device, a first time threshold set by the terminal device, a distance relaxation amount set by the terminal device, a time relaxation amount set by the terminal device, a second time threshold for the terminal device to stay in a sub-zone, a boundary threshold of a sub-zone in which the terminal device is located, or a priority of a frequency corresponding to the TN cell.

In a possible implementation, once determining a coordinate location of the TN cell, the terminal device sets a distance reselection threshold $D_{target}$ and a first time threshold $T_{target1}$. The distance reselection threshold is used to determine, based on a distance between the terminal device and the TN cell, whether to perform the cell reselection. The sub-zone in which the terminal device is located may be referred to as a first sub-zone. When the terminal device performs the cell reselection, a TN cell in the first sub-zone is preferentially considered. For example, the terminal device performs the cell reselection if a first distance between the terminal device and the TN cell in the first sub-zone is less than the distance reselection threshold.

The first distance may be determined based on location coordinates of the TN cell and/or location coordinates of the TN cell relative to a center of the NTN cell. In other words, the terminal device may directly obtain the location coordinates of the TN cell, or may calculate the location of the TN cell based on the relative location coordinates. For example, the terminal device derives an absolute distance between the terminal device and the TN cell from obtained relative location coordinates of the TN cell in the first sub-zone. If the absolute distance is less than the distance reselection threshold, the terminal device initiates reselection measurement.

In a possible implementation, the network device does not notify the terminal device of a coordinate location of the TN cell, and therefore the terminal device set only a first time threshold $T_{target1}$. If the terminal device failed in discovering the foregoing measures within the first time threshold and the UE failed in discovering a proper cell yet when a reselection time period T-target1 expires, the UE stays in the NTN region.

In a possible implementation, the terminal device sets a second time threshold $T_{target2}$ regardless of the number of TN cells whose related information has received by the terminal device. The second time threshold is a delay threshold for the terminal device to stay in a sub-zone. For example, the terminal device performs the cell reselection if a time for which the terminal device stays in the first sub-zone exceeds the second time threshold. A time threshold for the terminal device to stay in each sub-zone is constant or varies. The second time threshold is set based on a size of a sub-zone or the quantity of TN cells in the sub-zone.

In a possible implementation, the terminal device further sets a boundary threshold $M_{target}$. The boundary threshold is for the sub-zone in which the terminal device is located. If a distance between the terminal device and a boundary of the sub-zone is less than the boundary threshold, the terminal device considers measurement on TN cells in sub-zones at both sides of the boundary.

In a possible implementation, the terminal device further introduces relaxation measurement through a relaxation amount, to reduce measurement and power consumption. The relaxation amount may include a time relaxation amount and a distance relaxation amount. Relaxation measurement based on the time relaxation amount is time measurement relaxation. Relaxation measurement based on the distance relaxation amount is distance measurement relaxation.

In a possible implementation, the terminal device further performs the cell reselection based on the priority of the frequency corresponding to the TN cell. The priority-based cell reselection has been described above, and therefore details are not described here again.

The foregoing first time threshold may also be referred to as a time period threshold, and is used to limit a time period for which the terminal device performs the cell reselection.

In some embodiments, the terminal device determines, based on the foregoing plurality of pieces of measurement-related information, whether to perform the cell reselection. For example, if a delay for which the terminal device stays in the first sub-zone exceeds the second time threshold and/or a distance between the terminal device and a nearest TN cell is within the distance reselection threshold, the terminal device performs the reselection measurement, and initiates the cell reselection. For another example, if the terminal device obtains the location coordinates of the TN cell in the first sub-zone and the distance between the terminal device and the TN cell is within the reselection distance threshold, the terminal device initiates reselection measurement regardless of whether the second time threshold has expired.

In some embodiments, measurement relaxation is involved through a relaxation amount. The relaxation amount may also be referred to as a relax amount. In a measurement relaxation state, the terminal device still follows a frequency measurement rule based on RSRP of an existing serving cell of a same or lower priority.

In a possible implementation, if a time for which the terminal device performs the cell reselection based on the distance reselection threshold or the second time threshold exceeds the first time threshold, but the terminal device failed in discovering a proper cell, the first time threshold is relaxed. For example, the terminal device may stay in the first sub-zone, and relax the first time threshold based on the time relaxation amount. The relaxation amount is $T_{offset}$, and a first time threshold corresponding to the time measurement relaxation is $T_{target1}+T_{offset}$. Therefore, a time period for next reselection is $T_{target1}+T_{offset}$. In this case, the terminal device is in the time measurement relaxation of the TN cell.

In a possible implementation, when the terminal device performs the cell reselection based on the distance reselection threshold or the second time threshold, if no proper cell is discovered within a distance less than the distance reselection threshold, the distance reselection threshold is relaxed. For example, the terminal device stays in the first sub-zone, and the distance reselection threshold is relaxed based on the distance relaxation amount. The relaxation amount is $D_{offset}$, and a distance reselection threshold corresponding to the distance measurement relaxation is $D_{target}+D_{offset}$. Therefore, a distance threshold for next reselection is $D_{target}+D_{offset}$. In this case, the terminal device is in the distance measurement relaxation of the TN cell.

In some embodiments, the terminal device that is the measurement relaxation, may determine, based on one or more pieces of information, whether to exit the measurement relaxation.

In a possible implementation, the terminal device may determine, based on whether the sub-zone in which the terminal device is located changes, whether to exit the measurement relaxation. For example, when the terminal device moves from one sub-zone to another sub-zone, the terminal device can determine the sub-zone in which the terminal device is located and determine a priority of a TN frequency of the region in which the terminal device is located. In this sub-zone, the terminal device performs cell reselection based on a newly set time threshold, a newly set distance threshold, or a newly set boundary threshold. Therefore, the measurement relaxation needs to be paused.

In another possible implementation, the terminal device may determine, based on whether a distance, a time, or a boundary measured by the terminal device reaches a corresponding threshold, whether to exit the measurement relaxation. For example, the terminal device newly sets a distance threshold, a boundary threshold, and a time threshold, and exits the relaxation measurement when these thresholds are reached.

In still another possible implementation, the terminal device may determine, based on whether a synchronization signal block (SSB) is detected in frequency detection, whether to exit the measurement relaxation. For example, the terminal device exits the relaxation measurement when detecting an SSB in a frequency.

In some embodiments, when the terminal device moves relative to the network device corresponding to the NTN cell and a time for which the terminal device stays in the first sub-zone exceeds the second time threshold, measurement performed by the terminal device for the cell reselection is determined based on the boundary threshold. If a distance between the terminal device and a boundary of the first sub-zone is less than a boundary threshold corresponding to the first sub-zone, the terminal device performs measurement for the cell reselection based on priorities of frequencies corresponding to the first sub-zone and a second sub-zone, where the second sub-zone is a sub-zone at which the terminal device is to arrive. If a distance between the terminal device and a boundary of the first sub-zone is greater than a boundary threshold corresponding to the first sub-zone, the terminal device performs measurement for the cell reselection on a frequency corresponding to the first sub-zone. In other words, if the delay for which the terminal device stays in the first sub-zone exceeds the second time threshold, and the distance between the terminal device and the boundary of the first sub-zone is less than the boundary threshold, both the first sub-zone and the second sub-zone where the terminal device is to arrive are involved in the measurement performed by the terminal device. The terminal device may perform the measurement based on the priorities of the frequencies corresponding to the two sub-zones. If the delay for which the terminal device stays in the first sub-zone exceeds the second time threshold, and the distance between the terminal device and the boundary of sub-zone is greater than the boundary threshold, the terminal device initiates measurement, and only a frequency list in the first sub-zone is involved in the measurement.

In some embodiments, if a distance between the terminal device and a nearest TN station is within the distance reselection threshold, the terminal device enables reselection measurement, and initiates the cell reselection. Alternatively, if the delay for which the terminal device stays in the first sub-zone does not exceed the second time threshold, regardless of the distance between the terminal device and the boundary, the terminal device does not initiate measurement for the cell reselection.

The foregoing describes how the terminal device performs the cell reselection based on a set threshold. The sub-zone in the NTN cell is mentioned in both description of the first assistant information and the threshold setting. As described above, a proper division into sub-zones can help the terminal device perform measurement and/or cell reselection.

To be consistent with the division of coverage of a terrestrial TN cellular network, an embodiment of the present application proposes a manner of dividing the NTN cell based on the coverage angle of the network device. Current coverage of the network device may be determined through a direction angle of an antenna of the network device. In the coverage, an included angle formed by a connection line between the network device and a coverage location and a vertical line between the network device and the ground is the coverage angle of the network device. In other words, a coverage angle corresponding to the terminal device may be determined based on a ratio of a distance between the terminal device and the network device to a height of the network device relative to the ground. The coverage angle may also be referred to as an offset angle. Terminal devices at different locations correspond to different coverage angles. At an edge location of the NTN cell, the coverage angle is the direction angle of the antenna. Therefore, the coverage angle of the network device is less than or equal to the direction angle of the antenna.

In some embodiments, dividing the NTN cell based on the coverage angle is determining a plurality of coverage angles corresponding to a plurality of sub-zones based on the direction angle of the antenna. The plurality of coverage angles may be in an arithmetic sequence, or may not be in an arithmetic sequence. For example, when the direction angle of the antenna is 60 degrees, the coverage angles corresponding to the plurality of sub-zones may be 15 degrees, 30 degrees, 45 degrees, and 60 degrees respectively. In other words, the NTN cell is divided into four sub-zones based on the direction angle, and a boundary of each sub-zone is determined based on coverage angles corresponding to the four sub-zones. For another example, at a cell edge, a coverage angle of a satellite is $\alpha_{max}$, and the angle may be divided into $\alpha_1$, $\alpha_2$, $\alpha_3$, . . . , $\alpha_i$, where $\alpha_1 < \alpha_2 < \alpha_3 \ldots < \alpha_i < \alpha_{max}$.

In a possible implementation, the plurality of sub-zones that the NTN is divided into may be a plurality of circular or ring-shaped regions with a projection location of the network device perpendicular to the ground as a center. When the NTN cell includes N sub-zones (where N is a natural number greater than 1), N coverage angles respectively corresponding to boundaries, away from the center, of the N sub-zones meet the following condition:

$$0 < \alpha_i < \alpha_i + 1 \le \alpha_N,$$

where $\alpha_i$ is a coverage angle corresponding to a boundary, away from the center, of an $i^{th}$ sub-zone in the N sub-zones, i is a natural number from 1 to N−1, and $\alpha_N$ is the direction angle of the antenna of the network device.

In a possible implementation, the plurality of sub-zones that the NTN cell is divided into may equally or not equally divide the coverage of the NTN cell. For example, when the NTN cell includes N sub-zones, the NTN cell may be equally divided into the N sub-zones. In other words, the N sub-zones may be equal in area. For another example, the N sub-zones may be partially equal, or not equal in area.

In some embodiments, the sub-zone in the NTN cell may further be determined based on a projection location of the network device perpendicular to the ground. The projection location may be referred to as a first location. The NTN may determine the boundary of the sub-zone based on the coverage angle, and the boundary of the sub-zone includes a curve with the first location as a center. The first location may be determined based on coordinates of the network device. For example, the terminal device may determine an orbital parameter or a PVT parameter of the network device based on ephemeris data corresponding to the network device. These parameters may determine coordinates of the network device projected to the ground. Location information of a plurality of sub-zones in the NTN cell may be determined based on the first location and the coverage angle.

In some embodiments, when the NTN cell is divided based on the coverage angle, a plurality of pieces of other information may also be considered. In other words, a plurality of virtual sub-zones in the NTN cell may further be determined based on one or more pieces of other related information. The other related information may include coordinates of the network device, a geographical environment of coverage of the NTN cell, distribution of TN cells in the coverage of the NTN cell, a limitation on signal interaction of the NTN cell, a measurement requirement and/or a handover requirement of the terminal device, or assistant information provided by the terminal device. For example, when the NTN cell is divided into N sub-zones, a quantity of sub-zones may be increased by increasing a value of N based on the other foregoing related information, and the NTN cell can be more finely divided.

In a possible implementation, the sub-zone in the NTN cell is adapted to the coordinates of the network device and coverage of the TN cells. For example, when the coordinates show that the network device is located in a densely populated region or there are more TN cells in the NTN cell, the quantity of sub-zones may be increased. By increasing the quantity of sub-zones, the transition from the NTN cell to the TN cell can be performed more accurately.

In a possible implementation, the sub-zone in the NTN cell is adapted to the geographical environment of the coverage. For example, when main coverage of the NTN cell is an ocean or a desert, the quantity of sub-zones may be reduced. Because there are few TN cells in this region, a probability of handover to the TN cell is small.

In a possible implementation, the sub-zone in the NTN cell is determined based on the limitation on the signal interaction of the NTN cell. For example, when there are more TN cells in the NTN cell, if there are more sub-zones, the terminal device needs to perform more signal interaction with the network device to meet requirements for performing measurement or handover between different sub-zones. When the network device is a satellite, a transmission delay is relatively large. To reduce interaction, the quantity of sub-zones may be reduced.

In a possible implementation, the sub-zone in the NTN cell may be determined based on the measurement requirement and/or the handover requirement of the terminal device. For example, to reduce power consumption, when an accuracy requirement for measurement or handover by the terminal device is high, the quantity of sub-zones may be increased to reduce a deviation in subsequent measurement and handover determinization.

In a possible implementation, the sub-zone in the NTN cell may further be determined based on the other assistant information provided by the terminal device, for example, surrounding environment information provided by the terminal device for the network device, or location information determined in another manner. The network device may determine the quantity of sub-zones based on assistant information provided by a plurality of terminal devices.

In view of above, in addition to the coverage angle and the location of the network device, a ground condition of coverage of the NTN cell, the TN cell distribution in the coverage, a communication requirement, and the assistant information provided by the terminal device may be considered for determining the division of the NTN cell and the quantity of sub-zones, so that the NTN cell can be more accurately divided and the division can be adapted to the geographical coverage to a greater extent.

Figure 8:
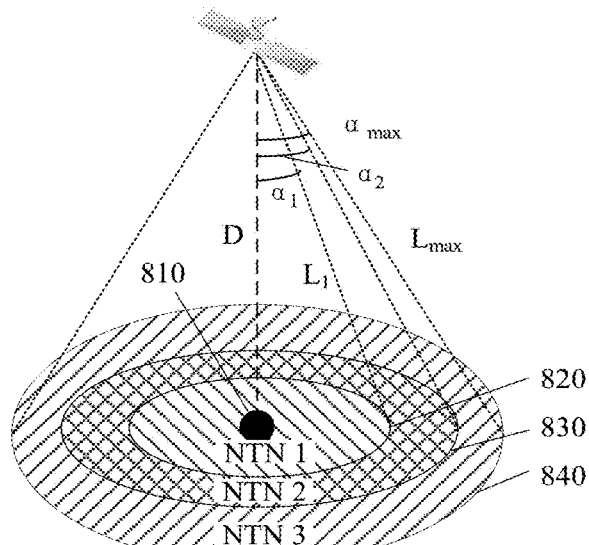
FIG. 8 is a schematic diagram showing division of an NTN cell according to an embodiment of the present application.

The following specifically describes the division of the NTN cell proposed in this embodiment of the present application with reference to FIG. 8.

Referring to FIG. 8, the projection location of the network device perpendicular to the ground is a first location 810, and the direction angle of the antenna is a maximum direction angle $\alpha_{max}$ of the network device. The NTN cell is divided into three sub-zones based on the direction angle, that is, an NTN 1, an NTN 2, and an NTN 3. As shown in FIG. 8, boundaries of the three sub-zones are centered around the first location 810. Specifically, a boundary curve 820 of the sub-zone NTN 1 is a circle with the first location 810 as a center. Boundaries of the sub-zone NTN 2 are respectively the curve 820 and a curve 830, where the curve 830 is also a circle with the first location 810 as a center. Similarly, boundaries of the sub-zone NTN 3 are respectively the curve 830 and a curve 840, where the curve 840 is also a circle with the first location 810 as a center.

As shown in FIG. 8, coverage angles of the network device that are corresponding to the boundaries of the plurality of sub-zones are less than or equal to the direction angle of the antenna. A coverage angle corresponding to the boundary curve 820 of the sub-zone NTN 1 is $\alpha_1$, and $\alpha_1$ is less than $\alpha_{max}$. Coverage angles corresponding to the two boundaries of the sub-zone NTN 2 are respectively $\alpha_1$ and $\alpha_2$, and both are less than $\alpha_{max}$. A coverage angle corresponding to the inner boundary curve 830 of the sub-zone NTN 3 is $\alpha_2$, and a coverage angle corresponding to the outer boundary curve 840 is equal to $\alpha_{max}$.

A coverage angle corresponding to the terminal device in a sub-zone is within a coverage angle range corresponding to boundaries of the sub-zone. For example, a coverage angle corresponding to the terminal device in the sub-zone NTN 1 is less than or equal to $\alpha_1$.

It should be understood that the division based on concentric circle shown in FIG. 8 is only an example, and another division based on a coverage angle is also applicable to the present application. For example, a plurality of elliptic sub-zones may be determined based on coverage angles of the network device in a plurality of directions.

The division of the NTN cell described with reference to FIG. 8 may be applicable to a quasi-earth fixed cell and a quasi-earth moving cell. For different cell types, locations of the terminal device relative to the network device change differently. Details are described below.

The division of the NTN cell shown in FIG. 8 may be better unified with coverage division of a terrestrial TN cellular network. In this division, the NTN network may be better coupled to the terrestrial cellular system to prevent blind spots in the measurement. In addition to the division based on the direction angle, the NTN cell with an antenna may be divided in a plurality of other manners, which are briefly described with reference to FIG. 9 and FIG. 10 below.

Figure 9:
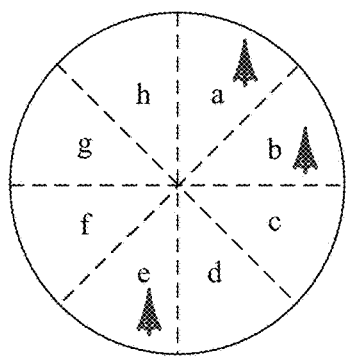
FIG. 9 is a schematic diagram showing another division of an NTN cell according to an embodiment of the present application.
Figure 10:
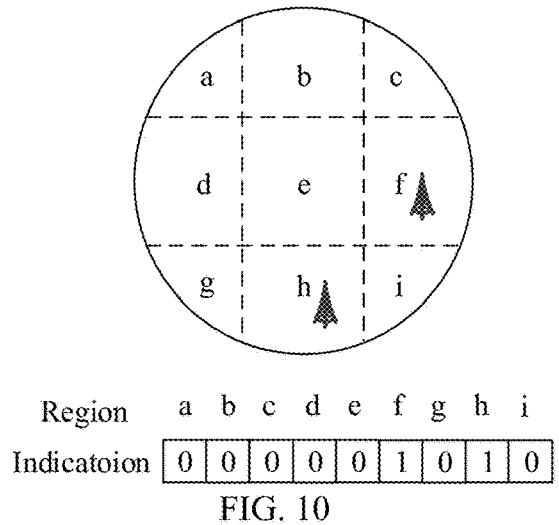
FIG. 10 is a schematic diagram showing division of an NTN cell according to an embodiment of the present application.

As described above, the NTN cell may be divided in other manners. FIG. 9 and FIG. 10 show two possible divisions.

Referring to FIG. 9, the NTN cell is equally divided into eight sub-zones by four diameters intersected with each other. The eight sub-zones are respectively a sub-zone a, a sub-zone b, a sub-zone c, a sub-zone d, a sub-zone e, a sub-zone f, a sub-zone g, and a sub-zone h. As shown in FIG. 8, there is a TN cell in each of the sub-zone a, the sub-zone b, and the sub-zone e.

Referring to FIG. 10, the NTN cell is divided into nine sub-zones in a grid pattern. The nine sub-zones are respectively a sub-zone a, a sub-zone b, a sub-zone c, a sub-zone d, a sub-zone e, a sub-zone f, a sub-zone g, a sub-zone h, and a sub-zone i. As shown in FIG. 9, there is a TN cell in each of the sub-zone f and the sub-zone h.

If there are TN cells in sub-zones in FIG. 9 and FIG. 10, indication information may be used for indication. For example, in the indication information, a bit corresponding to a sub-zone that includes a TN cell is set to 1; otherwise, the bit is set to 0. A division rule and a numbering rule may be preconfigured for the terminal device. In this manner, the network device only needs to provide several bits for the terminal device to indicate a location of a TN cell. In a possible implementation, the network device may notify the terminal device of the foregoing indication message by broadcast, an SIB message, or an RRC message. Upon receiving the indication information, the terminal device may calculate a rough range of the TN cell based on a reference location and a radius of the NTN cell.

The foregoing division of the NTN cell described with reference to FIG. 8 is applicable to a quasi-earth fixed cell and a quasi-earth moving cell.

For a quasi-earth fixed cell, the coverage of the NTN cell may be divided into a plurality of sub-zones. For example, coverage of an NTN cell that is a quasi-earth fixed cell may be equally divided into n sub-zones in the manner shown in FIG. 8, or may be unequally divided into several sub-zones based on distribution of TN cells.

In the case of the quasi-earth fixed cell, the coverage of the NTN cell remains unchanged, but a distance of the network device relative to the terminal device is changing. After a period of time, a current signal of the network device may not cover the terminal device. For example, when a distance L of a service link is less than a maximum distance $L_{max}$ of the service link and a coverage angle of a first network device corresponding to the terminal device is less than $\alpha_{max}$, the terminal device is within coverage of the first network device. For another example, when the distance of the service link is greater than the maximum distance or the coverage angle of the first network device corresponding to the terminal device is greater than $\alpha_{max}$, the terminal device is out of the coverage of the first network device. The terminal device may communicate with a second network device that replaced the first network device to serve the region. In other words, for the quasi-earth fixed cell, if the terminal device is stationary, the terminal device is always in a same sub-zone, but a network device that serves the terminal device changes.

For the quasi-earth moving cell, the coverage of the NTN cell varies with movement of the network device. After the NTN cell is divided, the sub-zone in which the terminal device is located varies with movement of the network device. If the terminal device is stationary, the sub-zone in which the terminal device is located changes. The terminal device may determine, based on a message (for example, the foregoing first message) sent by the network device, the sub-zone in which the terminal device is located and a subsequent change. If the terminal device is in a moving state, the terminal device needs to periodically receive a message from the network device, to determine sub-zones in which the terminal device is currently and subsequently located, so as to determine whether to trigger neighboring cell measurement and related measurement and calculation.

In some embodiments, the network device may provide the terminal device with an antenna beam angle of a cell center and a cell radius through broadcast information/system information/dedicated signalling. A direction of a sub-satellite point and a distance of a service link may be determined through the beam angle of the cell center. The network device may further provide the terminal device with division of the NTN cell. Based on a geographical location and different direction angles of the antenna, sub-zones that the NTN is divided into may be different. The terminal device may calculate coordinates of a reference location of the cell center based on the direction angle of the antenna and a moving speed of the network device. In addition, the terminal device further needs to calculate a cell edge through the cell radius or a threshold.

In some embodiments, a time threshold T is set when the network device moves. Each time when T elapses, the network device may provide reference information to the terminal device. The network device may provide, each time, an updated ephemeris parameter for a moving cell, or provide an ephemeris parameter with a timestamp. In addition, the network device may also provide a plurality of reference locations and time information or a moving speed thereof for the moving cell. After determining a time at which the terminal device arrives at the cell edge, the terminal device knows when to initiate cell measurement and cell reselection.

The method embodiments of the present application are described in detail above with reference to FIG. 4 to FIG. 10.

The apparatus embodiments of the present application are described in detail below with reference to FIG. 11 to FIG. 13. It should be understood that the description of the apparatus embodiments corresponds to the description of the method embodiments, and therefore, for parts that are not described in detail, reference may be made to the foregoing method embodiments.

Figure 11:
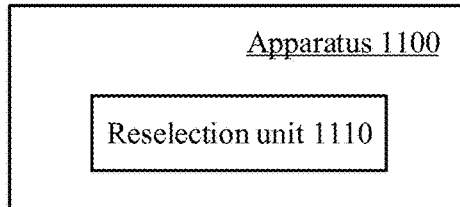
FIG. 11 is a schematic structural diagram of an apparatus for wireless communication according to an embodiment of the present application.

FIG. 11 is a schematic block diagram of an apparatus for wireless communication according to an embodiment of the present application. The apparatus 1100 may be any terminal device described above. The apparatus 1100 shown in FIG. 11 includes a reselection unit 1110.

The reselection unit 1110 is configured to perform cell reselection in an NTN cell based on first assistant information, where the first assistant information is associated with one or more of the following information: distribution of TN cells in the NTN cell; a sub-zone in the NTN cell, where the sub-zone is related to a coverage angle of a network device corresponding to the NTN cell; or a TN cell included in the sub-zone in the NTN cell.

Optionally, the first assistant information further includes one or more of the following information: a frequency information group, of a TN cell, corresponding to the sub-zone in the NTN cell; location coordinates of the TN cell; location coordinates of the TN cell relative to a center of the NTN cell; frequency information of the TN cell; a reference location and a distance threshold of a neighboring cell of the TN cell; coverage of the TN cell; or a boundary line between coverage of the TN cell and coverage of the NTN cell.

Optionally, the coverage of the TN cell is determined based on a distance range and/or an angle range of the TN cell that are/is relative to the center of the NTN cell, and the angle range is determined based on a reference direction.

Optionally, the reference direction is determined based on a moving track of the network device corresponding to the NTN cell.

Optionally, a representation manner of the coverage of the TN cell is related to an angle of the TN cell relative to the reference direction: if an angle $\beta_1$ of the TN cell relative to the reference direction is less than 90 degrees and a distance between the TN cell and the center of the NTN cell is between $DL_1$ and $DL_2$, the coverage of the TN cell is represented by $\beta_1$, $DL_1$, and $DL_2$; or if an angle $\beta_2$ of the TN cell relative to the reference direction is greater than or equal to 90 degrees and a distance between the TN cell and the center of the NTN cell is between $DL_1$ and $DL_2$, the coverage of the TN cell is represented by 90 degrees, $\beta_2$, $DL_1$, and $DL_2$.

Optionally, the NTN cell includes a plurality of sub-zones, each of the plurality of sub-zones corresponds to one frequency information group, one or more frequencies in the frequency information group each have a corresponding priority, and the priority is used by the terminal device to perform the cell reselection.

Optionally, the apparatus 1100 further includes a measurement unit, configured to: if a reselection priority of a frequency corresponding to the TN cell is higher than a reselection priority of a frequency corresponding to the NTN cell, perform measurement for the cell reselection based on priorities of different frequencies in a frequency list and/or a frequency list of a radio access technology.

Optionally, the first assistant information is carried in one or more of the following information: broadcast information, system information, or dedicated signalling.

Optionally, the terminal device further performs the cell reselection based on one or more of the following information: a distance reselection threshold set by the terminal device; a first time threshold set by the terminal device; a distance relaxation amount set by the terminal device; a time relaxation amount set by the terminal device; a second time threshold for the terminal device to stay in a sub-zone; a boundary threshold of a sub-zone in which the terminal device is located; or a priority of a frequency corresponding to the TN cell in the NTN cell.

Optionally, the terminal device is located in a first sub-zone of the NTN cell, and the reselection unit 1110 is further configured to perform the cell reselection if a first distance between the terminal device and a TN cell in the first sub-zone is less than the distance reselection threshold.

Optionally, the first distance is determined based on location coordinates of the TN cell and/or location coordinates of the TN cell relative to a center of the NTN cell.

Optionally, the measurement unit is further configured to: if the terminal device failed in discovering a cell for handover through the cell reselection, enter distance measurement relaxation based on the distance relaxation amount.

Optionally, the distance reselection threshold set by the terminal device is $D_{target}$, the distance relaxation amount is $D_{offset}$, and a distance reselection threshold corresponding to the distance measurement relaxation is $D_{target}+D_{offset}$.

Optionally, the terminal device is located in a first sub-zone of the NTN cell, and the reselection unit 1110 is further configured to perform the cell reselection if a time for which the terminal device stays in the first sub-zone exceeds the second time threshold.

Optionally, a time for which the reselection unit 1110 performs the cell reselection based on the distance reselection threshold or the second time threshold exceeds the first time threshold, and the measurement unit is further configured to: if the terminal device failed in discovering a cell for handover within the first time threshold, enter time measurement relaxation based on the time relaxation amount.

Optionally, the first time threshold set by the terminal device is $T_{target1}$, the time relaxation amount is $T_{offset}$, and a first time threshold corresponding to the time measurement relaxation is $T_{target1}+T_{offset}$.

Optionally, the terminal device exits the distance measurement relaxation or the time measurement relaxation based on one or more of the following information: whether the sub-zone in which the terminal device is located changes; whether a distance, a time, or a boundary measured by the terminal device reaches a corresponding threshold; or whether the terminal device detects a synchronization signal block in frequency detection.

Optionally, when the terminal device moves relative to the network device corresponding to the NTN cell, and a time for which the terminal device stays in a first sub-zone exceeds the second time threshold, the measurement unit is further configured to: if a distance between the terminal device and a boundary of the first sub-zone is less than a boundary threshold corresponding to the first sub-zone, perform measurement for the cell reselection based on priorities of frequencies corresponding to the first sub-zone and a second sub-zone at which the terminal device is to arrive; or if a distance between the terminal device and a boundary of the first sub-zone is greater than a boundary threshold corresponding to the first sub-zone, perform measurement for the cell reselection on a frequency corresponding to the first sub-zone.

Optionally, the NTN cell and the TN cell in the NTN cell are located in a same PLMN, the terminal device is in an inactive state, and the reselection unit is further configured to: if the cell reselection is performed, retain a communication parameter between the terminal device and a current cell.

Optionally, the communication parameter includes a protocol data unit session and a data radio bearer that is configured by the terminal device.

Optionally, the terminal device is in an inactive state, and if the cell reselection is performed, updating of a mobility registration area is triggered.

Optionally, a boundary of the sub-zone in the NTN cell corresponds to the coverage angle of the network device corresponding to the NTN cell, a projection location of the network device perpendicular to a ground is a first location, and the boundary of the sub-zone includes a curve with the first location as a center.

Optionally, the NTN cell includes N sub-zones, N is a natural number greater than 1, and N coverage angles respectively corresponding to boundaries, away from the first location, of the N sub-zones meet the following condition:

$$0 < \alpha_i < \alpha_i + 1 \le \alpha_N,$$

where $\alpha_i$ is a coverage angle corresponding to a boundary, away from the first location, of an $i^{th}$ sub-zone in the N sub-zones, i is a natural number from 1 to N−1, and $\alpha_N$ is a direction angle of an antenna of the network device.

Optionally, the NTN cell includes N sub-zones, N is a natural number greater than 1, and coverage of the NTN cell is equally or not equally divided into the N sub-zones.

Optionally, the sub-zone in the NTN cell is further determined based on one or more of the following information: coordinates of the network device corresponding to the NTN cell; a geographical environment of coverage of the NTN cell; distribution of TN cells in coverage of the NTN cell; a limitation on signal interaction of the NTN cell, a measurement requirement and/or a handover requirement of the terminal device; or assistant information provided by the terminal device.

Figure 12:
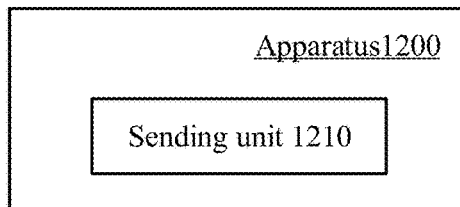
FIG. 12 is a schematic structural diagram of another apparatus for wireless communication according to an embodiment of the present application.

FIG. 12 is a schematic block diagram of an apparatus for wireless communication according to another embodiment of the present application. The apparatus 1200 may be any network device described above. The apparatus 1200 shown in FIG. 12 includes a sending unit 1210.

The sending unit 1210 is configured to send first assistant information to a terminal device, where the first assistant information is used by the terminal device to perform cell reselection in an NTN cell, and the first assistant information is associated with one or more of the following information: distribution of TN cells the NTN cell; a sub-zone in the NTN cell, where the sub-zone is related to a coverage angle of a network device corresponding to the NTN cell; or a TN cell included in the sub-zone in the NTN cell.

Optionally, the first assistant information further includes one or more of the following information: a frequency information group, of a TN cell, corresponding to the sub-zone in the NTN cell; location coordinates of the TN cell; location coordinates of the TN cell relative to a center of the NTN cell; frequency information of the TN cell; a reference location and a distance threshold of a neighboring cell of the TN cell; coverage of the TN cell; or a boundary line between coverage of the TN cell and coverage of the NTN cell.

Optionally, the coverage of the TN cell is determined based on a distance range and/or an angle range of the TN cell that are/is relative to the center of the NTN cell, and the angle range is determined based on a reference direction.

Optionally, the reference direction is determined based on a moving track of the network device corresponding to the NTN cell.

Optionally, a representation manner of the coverage of the TN cell is related to an angle of the TN cell relative to the reference direction: if an angle $\beta_1$ of the TN cell relative to the reference direction is less than 90 degrees and a distance between the TN cell and the center of the NTN cell is between $DL_1$ and $DL_2$, the coverage of the TN cell is represented by $\beta_1$, $DL_1$, and $DL_2$; or if an angle $\beta_2$ of the TN cell relative to the reference direction is greater than or equal to 90 degrees and a distance between the TN cell and the center of the NTN cell is between $DL_1$ and $DL_2$, the coverage of the TN cell is represented by 90 degrees, $\beta_2$, $DL_1$, and $DL_2$.

Optionally, the NTN cell includes a plurality of sub-zones, each of the plurality of sub-zones corresponds to one frequency information group, one or more frequencies in the frequency information group each have a corresponding priority, and the priority is used by the terminal device to perform the cell reselection.

Optionally, the first assistant information is carried in one or more of the following information: broadcast information, system information, or dedicated signalling.

Optionally, a boundary of the sub-zone in the NTN cell corresponds to the coverage angle of the network device, a projection location of the network device perpendicular to the ground is a first location, and the boundary of the sub-zone includes a curve with the first location as a center.

Optionally, the NTN cell includes N sub-zones, N is a natural number greater than 1, and N coverage angles respectively corresponding to boundaries, away from the first location, of the N sub-zones meet the following condition:

$$0 < \alpha_i < \alpha_{i+1} \le \alpha_N,$$

where $\alpha_i$ is a coverage angle corresponding to a boundary, away from the first location, of an $i^{th}$ sub-zone in the N sub-zones, i is a natural number from 1 to N−1, and $\alpha_N$ is a direction angle of an antenna of the network device.

Optionally, the NTN cell includes N sub-zones, N is a natural number greater than 1, and coverage of the NTN cell is equally or not equally divided into the N sub-zones.

Optionally, the sub-zone in the NTN cell is further determined based on one or more of the following information: coordinates of the network device; a geographical environment of coverage of the NTN cell; distribution of TN cells in coverage of the NTN cell; a limitation on signal interaction of the NTN cell, a measurement requirement and/or a handover requirement of the terminal device; or assistant information provided by the terminal device.

Figure 13:
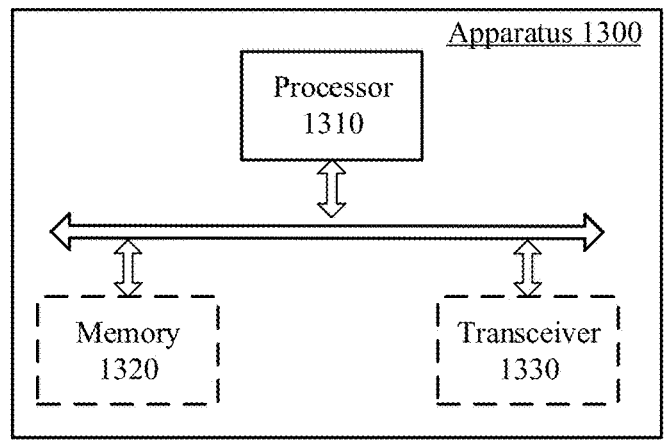
FIG. 13 is a schematic structural diagram of a communications apparatus according to an embodiment of the present application.

FIG. 13 is a schematic structural diagram of a communications apparatus according to an embodiment of the present application. Dashed lines in FIG. 13 indicate that a unit or module is optional. The apparatus 1300 may be configured to implement the methods described in the foregoing method embodiments. The apparatus 1300 may be a chip, a terminal device, or a network device.

The apparatus 1300 may include one or more processors 1310. The processor 1310 may allow the apparatus 1300 to implement the methods described in the foregoing method embodiments. The processor 1310 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, any conventional processor or the like.

The apparatus 1300 may further include one or more memories 1320. The memory 1320 stores a program that is executable by the processor 1310 to cause the processor 1310 to perform the methods described in the foregoing method embodiments. The memory 1320 may be independent of the processor 1310 or may be integrated into the processor 1310.

The apparatus 1300 may further include a transceiver 1330. The processor 1310 may communicate with another device or chip through the transceiver 1330. For example, the processor 1310 may transmit data to and receive data from another device or chip through the transceiver 1330.

An embodiment of the present application further provides a computer-readable storage medium for storing a program. The computer-readable storage medium may be applied to the terminal or the network device provided in the embodiments of the present application, and the program causes a computer to perform the methods performed by the terminal or the network device in various embodiments of the present application.

In some embodiments, the computer-readable storage medium may be any usable medium readable by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state drive (SSD)), or the like.

An embodiment of the present application further provides a computer program product. The computer program product includes a program. The computer program product may be applied to the terminal or the network device provided in the embodiments of the present application, and the program causes a computer to perform the methods performed by the terminal or the network device in various embodiments of the present application.

All or some of the foregoing embodiments may be implemented by software, hardware, firmware, or any combination thereof. When software is used to implement embodiments, the foregoing embodiments may be implemented completely or partially in a form of computer program product. The computer program product includes one or more computer instructions. When the computer program instructions are loaded and executed on a computer, the procedures or functions according to the embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (for example, through a coaxial cable, an optical fiber, and a digital subscriber line (DSL)) manner or a wireless (for example, over infrared, wireless, and microwave) manner.

An embodiment of the present application further provides a computer program. The computer program may be applied to the terminal or the network device provided in the embodiments of the present application, and the computer program causes a computer to perform the methods performed by the terminal or the network device in various embodiments of the present application.

The terms "system" and "network" in the present application may be used interchangeably. In addition, the terms used in the present application are only used to explain the specific embodiments of the present application, and are not intended to limit the present application. The terms "first", "second", "third", "fourth", and the like in the specification, claims, and drawings of the present application are used to distinguish between different objects, rather than to describe a specific order. In addition, the terms "include" and "have" and any variations thereof are intended to cover a non-exclusive inclusion.

In the embodiments of the present application, "indicate" mentioned herein may refer to a direct indication, or may refer to an indirect indication, or may mean that there is an association relationship. For example, A indicates B, which may mean that A directly indicates B, for example, B may be obtained from A; or may mean that A indirectly indicates B, for example, A indicates C, and B may be obtained from C; or may mean that there is an association relationship between A and B.

In the embodiments of the present application, the term "corresponding" may mean that there is a direct or indirect correspondence between the two, or may mean that there is an association relationship between the two, which may also be a relationship such as indicating and being indicated, or configuring and being configured.

In the embodiments of the present application, the "protocol" may refer to a standard protocol in the communications field, and may include, for example, an LTE protocol, an NR protocol, and a related protocol applied to a future communications system, which is not limited in the present application.

In the embodiments of the present application, determining B based on A does not mean determining B based only on A. Instead, B may be determined based on A and/or other information.

In the embodiments of the present application, the term "and/or" is merely an association relationship that describes associated objects, and represents that there may be three relationships. For example, A and/or B may represent three cases: only A exists, both A and B exist, and only B exists. In addition, the character "/" in the specification generally indicates an "or" relationship between the associated objects.

In several embodiments provided in the present application, it should be understood that, the disclosed system, apparatus, and method may be implemented in other manners. For example, the foregoing described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatus or units may be implemented in electronic, mechanical, or other forms.

The units described as separate parts may or may not be physically separate, and parts displayed as units may or may not be physical units, that is, may be located in one place, or may be distributed among a plurality of network units. Some or all of the units may be selected according to actual needs to achieve the objective of the solutions of embodiments.

In addition, function units in the embodiments of the present application may be integrated into one processing unit, or each of the units may exist alone physically, or two or more units may be integrated into one unit.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for wireless communication, comprising:
    performing, by a terminal device, cell reselection in a non-terrestrial network (NTN) cell based on first assistant information, wherein the first assistant information is associated with one or more of the following information:
       a sub-zone in the NTN cell, wherein the sub-zone is related to a coverage angle of a network device corresponding to the NTN cell; or
       a terrestrial network (TN) cell comprised in the sub-zone in the NTN cell, and wherein the terminal device is located in a first sub-zone of the NTN cell, and the cell reselection is performed in response to at least in part a first distance between the terminal device and a TN cell in the first sub-zone being less than a distance reselection threshold.

2. The method according to claim 1, wherein the first assistant information further comprises one or more of the following information:
    a frequency information group, of a TN cell, corresponding to the sub-zone in the NTN cell;
    location coordinates of the TN cell;
    location coordinates of the TN cell relative to a center of the NTN cell;
    frequency information of the TN cell;
    a reference location and a distance threshold of a neighboring cell of the TN cell;
    coverage of the TN cell; or
    a boundary line between coverage of the TN cell and coverage of the NTN cell.

3. The method according to claim 2, wherein the coverage of the TN cell is determined based on at least one of a distance range or an angle range of the TN cell relative to the center of the NTN cell, and the angle range is determined based on a reference direction.

4. The method according to claim 3, wherein the reference direction is determined based on a moving track of the network device corresponding to the NTN cell.

5. The method according to claim 3, wherein the coverage of the TN cell is related to an angle of the TN cell relative to the reference direction:
    when an angle $\beta_1$ of the TN cell relative to the reference direction is less than 90 degrees and a distance between the TN cell and the center of the NTN cell is between $DL_1$ and $DL_2$, the coverage of the TN cell is determined by $\beta_1$, $DL_1$, and $DL_2$; or when an angle $\beta_2$ of the TN cell relative to the reference direction is greater than or equal to 90 degrees and a distance between the TN cell and the center of the NTN cell is between $DL_1$ and $DL_2$, the coverage of the TN cell is determined by 90 degrees, $\beta_2$, $DL_1$, and $DL_2$.

6. The method according to claim 2, wherein the NTN cell comprises a plurality of sub-zones, each of the plurality of sub-zones corresponds to one frequency information group, one or more frequencies in the frequency information group each have a corresponding priority, and the priority is used by the terminal device to perform the cell reselection.

7. The method according to claim 6, wherein the method further comprises:
when a reselection priority of a frequency corresponding to the TN cell is higher than a reselection priority of a frequency corresponding to the NTN cell, performing, by the terminal device, measurement for the cell reselection based on priorities of different frequencies in a frequency list or a frequency list of a radio access technology.

8. The method according to claim 1, wherein the first assistant information is carried in one or more of the following information: broadcast information, system information, or dedicated signalling.

9. The method according to claim 1, wherein the terminal device performs the cell reselection based on one or more of the following information:
a first time threshold set by the terminal device;
a distance relaxation amount set by the terminal device;
a time relaxation amount set by the terminal device;
a second time threshold for the terminal device to stay in a sub-zone;
a boundary threshold of a sub-zone in which the terminal device is located; or
a priority of a frequency corresponding to the TN cell in the NTN cell.

10. The method according to claim 1, wherein the first distance is determined based on location coordinates of the TN cell or location coordinates of the TN cell relative to a center of the NTN cell.

11. The method according to claim 1, wherein the method further comprises:
when the terminal device failed in discovering a cell for handover through the cell reselection, entering, by the terminal device, distance measurement relaxation based on a distance relaxation amount.

12. The method according to claim 11, wherein the distance reselection threshold set by the terminal device is $D_{target}$, the distance relaxation amount is $D_{offset}$, and a distance reselection threshold corresponding to the distance measurement relaxation is $D_{target}+D_{offset}$.

13. The method according to claim 9, wherein the method further comprises:
performing, by the terminal device, the cell reselection when a time for which the terminal device stays in the first sub-zone exceeds the second time threshold.

14. The method according to claim 9, wherein a time for which the terminal device performs the cell reselection based on the distance reselection threshold or the second time threshold exceeds the first time threshold, and the method further comprises:
when the terminal device failed in discovering a cell for handover within the first time threshold, entering, by the terminal device, time measurement relaxation based on the time relaxation amount.

15. The method according to claim 14, wherein the first time threshold set by the terminal device is $T_{target1}$, the time relaxation amount is $T_{offset}$, and a first time threshold corresponding to the time measurement relaxation is $T_{target1}+T_{offset}$.

16. A method for wireless communication, comprising:
sending, by a network device, first assistant information to a terminal device, wherein the first assistant information comprises information for cell reselection in a non-terrestrial network (NTN) cell, and the first assistant information is associated with one or more of the following information:
a sub-zone in the NTN cell, wherein the sub-zone is related to a coverage angle of a network device corresponding to the NTN cell; or
a terrestrial network (TN) cell comprised in the sub-zone in the NTN cell; and
wherein the terminal device is located in a first sub-zone of the NTN cell, and the cell reselection is performed in response to at least in part a first distance between the terminal device and a TN cell in the first sub-zone being less than a distance reselection threshold.

17. The method according to claim 16, wherein the first assistant information further comprises one or more of the following information:
a frequency information group, of a TN cell, corresponding to the sub-zone in the NTN cell;
location coordinates of the TN cell;
location coordinates of the TN cell relative to a center of the NTN cell;
frequency information of the TN cell;
a reference location and a distance threshold of a neighboring cell of the TN cell;
coverage of the TN cell; or
a boundary line between coverage of the TN cell and coverage of the NTN cell.

18. The method according to claim 17, wherein the coverage of the TN cell is determined based on at least one of a distance range or an angle range of the TN cell relative to the center of the NTN cell, and the angle range is determined based on a reference direction.

19. An apparatus, comprising:
at least one processor;
one or more non-transitory computer-readable storage media coupled to the at least one processor and storing programming instructions for execution by the at least one processor, wherein the programming instructions, when executed, cause the apparatus to perform operations comprising:
performing cell reselection in a non-terrestrial network (NTN) cell based on first assistant information, wherein the first assistant information is associated with one or more of the following information:
a sub-zone in the NTN cell, wherein the sub-zone is related to a coverage angle of a network device corresponding to the NTN cell; or
a terrestrial network (TN) cell comprised in the sub-zone in the NTN cell; and
wherein the apparatus is located in a first sub-zone of the NTN cell, and the cell reselection is performed in response to at least in part a first distance between the apparatus and a TN cell in the first sub-zone being less than a distance reselection threshold.

20. The apparatus according to claim 19, wherein the first assistant information further comprises one or more of the following information:
a frequency information group, of a TN cell, corresponding to the sub-zone in the NTN cell;

location coordinates of the TN cell;
location coordinates of the TN cell relative to a center of the NTN cell;
frequency information of the TN cell;
a reference location and a distance threshold of a neighboring cell of the TN cell;
coverage of the TN cell; or
a boundary line between coverage of the TN cell and coverage of the NTN cell.

* * * * *